United States Patent
Linck et al.

(10) Patent No.: US 10,392,566 B2
(45) Date of Patent: Aug. 27, 2019

(54) CO-PROCESSING FOR CONTROL OF HYDROPYROLYSIS PROCESSES AND PRODUCTS THEREOF

(71) Applicant: GAS TECHNOLOGY INSTITUTE, Des Plaines, IL (US)

(72) Inventors: Martin B. Linck, Roscoe, IL (US); Terry L. Marker, Palos Heights, IL (US); Michael J. Roberts, Itasca, IL (US); Larry G. Felix, Pelham, AL (US)

(73) Assignee: Gas Technology Institute, Des Plaines, IL (US)

( * ) Notice: Subject to any disclaimer, the term of this patent is extended or adjusted under 35 U.S.C. 154(b) by 272 days.

(21) Appl. No.: 14/696,632

(22) Filed: Apr. 27, 2015

(65) Prior Publication Data

US 2016/0312125 A1    Oct. 27, 2016

(51) Int. Cl.
    *C10G 1/00*     (2006.01)
    *C10G 1/06*     (2006.01)
    (Continued)

(52) U.S. Cl.
    CPC .............. *C10G 1/06* (2013.01); *C10G 1/002* (2013.01); *C10G 1/08* (2013.01); *C10G 3/42* (2013.01);
    (Continued)

(58) Field of Classification Search
    CPC . C10G 1/06; C10G 1/002; C10G 1/08; C10G 3/42; C10G 3/50; C10G 2400/08;
    (Continued)

(56) References Cited

U.S. PATENT DOCUMENTS 3,625,664 A    12/1971    Padovani
3,997,423 A    12/1976    Greene
(Continued)

FOREIGN PATENT DOCUMENTS

CN    1473188 A    2/2004
JP    S5981385 A    5/1984
(Continued)

OTHER PUBLICATIONS

Sephton, M. A. et al., "Hydropyrolysis of High Molecular Weight Organic Matter in Murchison", Lunar and Planetary Science XXXIV, 2003.
(Continued)

*Primary Examiner* — In Suk C Bullock
*Assistant Examiner* — Ali Z Fadhel
(74) *Attorney, Agent, or Firm* — Banner & Witcoff, Ltd.

(57) ABSTRACT

Hydropyrolysis processes are described, in which differing types of feedstocks, including at least one biorenewable feedstock, namely a biomass-containing feedstock, may be co-processed to allow enhancements in operating conditions and/or product properties, depending on changing customer requirements and/or overall market demands. According to specific embodiments, an aliphatic hydrocarbon precursor or an aromatic hydrocarbon precursor is co-processed with the biomass-containing feedstock to enhance an operating condition (e.g., a reactor temperature profile) of the hydropyrolysis process and/or a property (e.g., cetane number) of a liquid product (e.g., a diesel boiling range fraction) obtained from a substantially fully deoxygenated hydrocarbon liquid.

18 Claims, 5 Drawing Sheets

(51) Int. Cl.
*C10G 1/08* (2006.01)
*C10G 3/00* (2006.01)

(52) U.S. Cl.
CPC ........ *C10G 3/50* (2013.01); *C10G 2300/1011* (2013.01); *C10G 2300/1014* (2013.01); *C10G 2300/1018* (2013.01); *C10G 2300/1022* (2013.01); *C10G 2300/301* (2013.01); *C10G 2300/305* (2013.01); *C10G 2300/307* (2013.01); *C10G 2400/02* (2013.01); *C10G 2400/04* (2013.01); *C10G 2400/08* (2013.01); *Y02P 30/20* (2015.11)

(58) Field of Classification Search
CPC .......... C10G 2300/305; C10G 2400/02; C10G 2400/04; C10G 2300/1022; C10G 2300/1014; C10G 2300/307; C10G 2300/1018; C10G 2300/301
See application file for complete search history.

(56) References Cited

U.S. PATENT DOCUMENTS

| | | | |
|---|---|---|---|
| 4,013,543 A | 3/1977 | Greene | |
| 4,166,786 A | 9/1979 | Duraiswamy et al. | |
| 4,252,736 A | 2/1981 | Haag et al. | |
| 4,260,473 A | 4/1981 | Bauer | |
| 4,326,944 A | 4/1982 | Meyer et al. | |
| 4,371,727 A | 2/1983 | Gavin | |
| 4,597,776 A | 7/1986 | Ullman et al. | |
| 4,645,585 A | 2/1987 | White | |
| 4,808,289 A | 2/1989 | McDaniel et al. | |
| 4,822,935 A | 4/1989 | Scott | |
| 5,055,181 A | 10/1991 | Maa et al. | |
| 5,096,569 A | 3/1992 | Maa et al. | |
| 5,605,551 A | 2/1997 | Scott et al. | |
| 6,132,597 A | 10/2000 | Harle et al. | |
| 6,596,780 B2 | 7/2003 | Jahnke et al. | |
| 6,991,578 B2 | 1/2006 | Ziemer | |
| 7,018,319 B2 | 3/2006 | Ziemer | |
| 7,115,061 B2 | 10/2006 | Tiesler et al. | |
| 7,163,484 B2 | 1/2007 | Klemen | |
| 7,201,698 B2 | 4/2007 | Gumpoltsberger | |
| 7,211,022 B2 | 5/2007 | Tiesler et al. | |
| 7,511,181 B2 | 3/2009 | Petri et al. | |
| 7,686,856 B2 | 3/2010 | Hemmings et al. | |
| 7,982,076 B2 | 7/2011 | Marker et al. | |
| 7,994,375 B2 | 8/2011 | Marker et al. | |
| 8,003,834 B2 | 8/2011 | Marker et al. | |
| 8,063,258 B2 | 11/2011 | Bartek et al. | |
| 8,084,655 B2 | 12/2011 | Dindi et al. | |
| 8,119,847 B2 | 2/2012 | Dindi et al. | |
| 8,217,210 B2 | 7/2012 | Agrawal et al. | |
| 8,420,875 B1 * | 4/2013 | Mackay | C10G 1/02 208/131 |
| 8,475,549 B2 | 7/2013 | Vogel et al. | |
| 8,492,600 B2 | 7/2013 | Marker et al. | |
| 8,816,144 B2 | 8/2014 | Felix et al. | |
| 8,841,495 B2 | 9/2014 | Marker et al. | |
| 8,859,831 B2 | 10/2014 | Marker et al. | |
| 8,915,981 B2 | 12/2014 | Marker et al. | |
| 2003/0130360 A1 | 7/2003 | Kindig et al. | |
| 2006/0219403 A1 | 10/2006 | Steinberg | |
| 2006/0270513 A1 | 11/2006 | Klemen | |
| 2006/0270516 A1 | 11/2006 | Klemen | |
| 2007/0010588 A1 | 1/2007 | Pearson | |
| 2007/0119098 A1 | 5/2007 | Diaz et al. | |
| 2007/0225382 A1 | 9/2007 | Van Den Berg et al. | |
| 2008/0006519 A1 | 1/2008 | Badger | |
| 2008/0053870 A1 | 3/2008 | Marker et al. | |
| 2008/0115415 A1 | 5/2008 | Agrawal et al. | |
| 2008/0229653 A1 | 9/2008 | Iversen et al. | |
| 2008/0293537 A1 | 11/2008 | Phillips | |
| 2009/0082604 A1 | 3/2009 | Agrawal et al. | |
| 2009/0084666 A1 | 4/2009 | Agrawal et al. | |
| 2009/0126274 A1 | 5/2009 | Vogel et al. | |
| 2009/0163744 A1 | 6/2009 | Abhari et al. | |
| 2009/0250376 A1 * | 10/2009 | Brandvold | C10G 69/00 208/17 |
| 2010/0256428 A1 * | 10/2010 | Marker | C01B 3/16 585/240 |
| 2011/0099888 A1 | 5/2011 | Bartek et al. | |
| 2011/0219677 A1 | 9/2011 | Koyama et al. | |
| 2012/0088945 A1 * | 4/2012 | Yao | C10G 45/08 585/357 |
| 2012/0310023 A1 * | 12/2012 | Huang | C10G 1/002 585/241 |
| 2013/0204054 A1 * | 8/2013 | Bartek | C10G 1/00 585/240 |
| 2013/0338412 A1 | 12/2013 | Marker et al. | |
| 2014/0075827 A1 * | 3/2014 | Gonzalez | G01N 21/59 44/307 |
| 2014/0100395 A1 | 4/2014 | Felix et al. | |
| 2017/0009143 A1 * | 1/2017 | Urade | C10G 45/44 |
| 2018/0216009 A1 * | 8/2018 | Narayanaswamy | C10G 47/32 |

FOREIGN PATENT DOCUMENTS

| | | | |
|---|---|---|---|
| JP | 2007-153928 A | 6/2007 | |
| JP | 2012-308564 A | 11/2007 | |
| JP | 2009509759 A | 3/2009 | |
| JP | 2011-515539 A | 5/2011 | |
| JP | 2011-526640 A | 10/2011 | |
| RU | 2124547 C1 | 1/1999 | |
| WO | 88/01611 A1 | 3/1988 | |
| WO | 00/21911 A1 | 4/2000 | |
| WO | 2009/029660 A2 | 3/2009 | |
| WO | 2009/038965 A1 | 3/2009 | |
| WO | 2009124017 A2 | 10/2009 | |
| WO | 2010058580 A1 | 5/2010 | |
| WO | 2010117437 A1 | 10/2010 | |
| WO | WO-2013074437 A1 * | 5/2013 | B01J 38/72 |

OTHER PUBLICATIONS

Guell, A. J. et al., "Effect of H2-Pressure on the Structures of Bio-oils from the Mild Hydropyrolysis of Biomass", Biomass and Bioenery, vol. 5., No. 2, pp. 155-171, 1993.

Rocha, J. Dilcio et al., "The Scope for Generating Bio-Oils with Relatively Low Oxygen Contents Via Hydropyrolysis", Organic Geochemistry, 30 (1999) 1527-1534.

Meier, D. et al., "Catalytic Hydroliquefaction of Spruce Wood— Elemental Balance and Effect of Catalyst", J Wood Chem Technology, vol. 8, No. 4, 1988 pp. 523-542.

Meier, D. et al. "Direct Catalytic Liquefaction Technology of Biomass Status and Review", Biomass Pyrolysis Liquids, 1991, pp. 93-102.

Meier, D. et al. "Effect of Hydrogen Pressure on Yields and Quality of Oils Obtained from Direct Liquefaction of Pine Wood", Energy From Biomass 4, 1989, pp. 584-592.

Meier D. et al., "High Liquid Yields from Lignin Via Catalytic Hydropyrolysis", Advances in Thermochemical Biomass Conversion, vol. 2, 1994, pp. 1016-1031.

Nikkhah, K. et al., "Co-pyrolysis of Various Biomass Materials and Coals", Energy from Biomass and Wastes, XVI, 1992, pp. 857-902.

Pindoria, R.V., et al., "A Two-Stage Fixed-Bed Reactor for Direct Hydrotreatment of Volatiles", Fuel, vol. 77, No. 15, Dec. 1998, pp. 1715-1726.

Scott, D.S., et al. "The Continuous Flash Pyrolysis of Biomass", Can J Chem Eng., vol. 62, No. 3, Jun. 1984, pp. 404-412.

Love, Gordon D. et al., "Release of covalently-bound alkane biomarkers in high yields from kerogen via catalytic hydropyrolysis", Org. Geochem., vol. 23, No. 10, pp. 981-986, 1995.

Oasmaa, et al. "Catalytic Hydrotreatment of Some Technical Lignins," Bioresource Technology (1993), vol. 45, pp. 189-194.

Meier et al. "Pyrolysis and Hydropyrolysis of Biomass and Lignins-Activities at the Institute of Wood Chemistry in Hamburg, Germany," Institute of Wood Chemistry and Chemical Technology of Wood (1996), pp. 298-303.

(56) References Cited

OTHER PUBLICATIONS

Elliott et al. "Catalytic Hydroprocessing of Biomass Fast Pyrolysis Bio-oil to Produce Hydrocarbon Products Environmental Progress and Sustainable Energy," Environmental Progress & Sustainable Energy (2009), vol. 28, No. 3, pp. 441-449.
Mohan et al. "Pyrolysis of Wood/Biomass for Bio-Oil: A Critical Review," Energy and Fuels (2006), vol. 20, pp. 848-889.
E. Putun, et al. "Effect of Mass Transfer and Hydrogen pressure on the Fixed Bed Pyrolysis of Sunflower Bagasse", 1997, http:/web.anl.gov/PCS/acsfuel/preprint%20archive/Files/Merge/Vol-39_4-0002.pdf.
Donald L. Klass, "Thermal Conversion: Pyrolysis and Liquefaction", Biomass for Renewable Energy, Fuels, and Chemicals, pp. 225-269.
J.D. Rocha, et al. "Hydrodeoxygenation of Oils from Cellulose in Single and Two-Stage Hydropyrolysis" Renewable Energy, vol. 9, pp. 950-953, 1996.
Ayse E. Putun, et al. "Oil Production from an arid-land plant: fixed-bed pyrolysis and hydropyrolysis of Euphorbia rigida", Fuel, vol. 75 No. 11, pp. 1307-1312, 1996.

\* cited by examiner

CO-PROCESSING FOR CONTROL OF HYDROPYROLYSIS PROCESSES AND PRODUCTS THEREOF

FIELD OF THE INVENTION

The disclosure is directed to adjustment and/or control of operating conditions and properties (e.g., quality and/or yield) of hydropyrolysis products, including properties of a substantially fully deoxygenated hydrocarbon product recovered in a hydropyrolysis process.

BACKGROUND

In the conventional pyrolysis of biomass, typically fast pyrolysis carried out in an inert atmosphere, a dense, acidic, reactive liquid bio-oil product is obtained, which contains water, oils, and char formed during the process. Much of the oxygen present in biomass ultimately resides in the bio-oil, thereby increasing its chemical reactivity. Characteristic total acid numbers (TAN) of conventional bio-oil are high, in the range of 100-200, indicating it is a highly corrosive material. Moreover, this product tends to undergo polymerization, is generally incompatible with petroleum hydrocarbons due to water miscibility and very high oxygen content (on the order of about 40% by weight), and has a low heating value. The unstable bio-oils of conventional pyrolysis tend to thicken over time and can also react to a point where hydrophilic and hydrophobic phases form. As a result, transportation and utilization of this product are problematic. Also, it is difficult to upgrade this product to a liquid hydrocarbon fuel, due to the retrograde reactions that typically occur in conventional pyrolysis processes, including fast pyrolysis. Dilution with methanol or other alcohols has been shown to reduce the activity and viscosity of the formed bio-oils, but this approach is not considered practical or economically viable, due to the large amounts of unrecoverable alcohol that are required to stabilize pyrolysis liquids.

The removal of char, generated by conventional pyrolysis, from the liquid pyrolysis product while it is still in the vapor phase presents an additional technical challenge. Significant amounts of oxygen and free radicals in the pyrolysis vapors remain highly reactive and form a pitch-like material upon contact with char particles on the surface of a filter or other solid separator. Consequently, devices used to separate char from the hot pyrolysis vapors can become quickly plugged, due to the reactions of char and pyrolysis vapor constituents that occur on and within the layer of char on the surfaces of such devices, as well as within the pores of porous filter elements. Finally, it is noted that the upgrading of pyrolysis oils, using conventional hydroconversion processes, consumes large quantities of $H_2$, and extreme process conditions, including high hydrogen pressures needed to meet product quality requirements, make such processes uneconomical. The reactions are inherently out of balance in that, due to the high pressures required, too much water is created while too much $H_2$ is consumed. In addition, conventional hydroconversion reactors can rapidly develop high pressure differentials, due to reactive coke precursors present in the pyrolysis oils or from coke produced as a result of catalysis.

More recently, the use of hydrogen in biomass pyrolysis (i.e., hydropyrolysis) has been disclosed. For example, hydropyrolysis processes taught in U.S. Pat. No. 8,492,600 have been found to overcome a number of the drawbacks of conventional fast pyrolysis processes, including those described above, and have led to a number of other processing advantages. Despite these and other improvements, the use of certain feedstocks, such as lignocellulosic biomass, in hydropyrolysis results in a defined distribution of hydrocarbons, following deoxygenation, that may be predominantly suitable for certain applications (e.g., in the production of an aromatic-rich, renewable gasoline fraction or blending component) but not others (e.g., in the production of a high cetane, renewable diesel fraction or blending component). The art of hydropyrolysis, however, would benefit significantly from processing options that allow flexibility in terms of providing hydrocarbon-containing product fractions in varying yields and compositions, and with desired product quality attributes (e.g., cold flow properties in the case of a diesel boiling range fraction or octane number in the case of a gasoline boiling range fraction). Such processing options could be adapted as needed to meet changing end-product demands in the art of renewable fuels, thereby maximizing overall value and process economics.

SUMMARY

Embodiments disclosed herein are associated with the discovery of hydropyrolysis processes in which differing types of feedstocks, including at least one biorenewable feedstock, namely a biomass-containing feedstock, may be co-processed to allow enhancements in operating conditions and/or product properties, depending on changing customer requirements and/or overall market demands. According to specific embodiments, an aliphatic hydrocarbon precursor or an aromatic hydrocarbon precursor is co-processed with the biomass-containing feedstock to enhance an operating condition of the hydropyrolysis process. Representative operating conditions include the reactor temperature profiles in the hydropyrolysis reactor, or otherwise in a downstream hydroconversion reactor that is used in a hydroconversion zone, for substantially complete deoxygenation of the partially deoxygenated hydropyrolysis product of the hydropyrolysis reactor. According to other specific embodiments, an aliphatic hydrocarbon precursor or an aromatic hydrocarbon precursor is co-processed with the biomass-containing feedstock to enhance a product property, such as the yield of a given fraction of the deoxygenated hydrocarbon liquid having a defined boiling point range (e.g., a diesel boiling range fraction or a gasoline boiling range fraction).

An "enhancement" in an operating condition or product property refers to a difference or change in the operating condition or product property, relative to the same operating condition or product property that is obtained in the absence of co-processing the aliphatic hydrocarbon precursor or aromatic hydrocarbon precursor, in which the difference or change is directionally favorable to achieving a desired operating objective (e.g., an increased yield or increased quality of a given boiling point range fraction of the substantially fully deoxygenated hydrocarbon liquid recovered from the hydroconversion reaction zone).

The co-processing of a wide variety of both renewable and non-renewable feedstocks, together with a biomass-containing feedstock, provides a number of advantages, described more fully below, in integrated hydropyrolysis processes. Particular advantages include those which cannot be obtained using conventional pyrolysis and in fact could not have been foreseen and/or predicted from knowledge of the state of the art in pyrolysis. Such advantages relate to (i) the ability to process certain aliphatic hydrocarbon precursors or aromatic hydrocarbon precursors (e.g., those comprising solids) in a hydropyrolysis reactor and thereby upgrade these feedstocks, upstream of the hydroconversion zone, often in a manner that achieves operational synergy with the biomass-containing feedstock, (ii) the ability to process certain aliphatic hydrocarbon precursors or aromatic hydrocarbon precursors in a hydroconversion reactor, with a reduction in the oxygen content of the combined feedstock, resulting from combination with the partially deoxygenated hydropyrolysis product, having an oxygen content that is significantly less than that of a conventional pyrolysis oil (bio-oil), thereby reducing the reactor temperature rise and maximum catalyst bed temperature in the hydroconversion reactor and prolonging hydroconversion catalyst life, (iii) the ability of certain aliphatic hydrocarbon precursors or aromatic hydrocarbon precursors to facilitate hydrogen production, for example by the steam reforming of propane that is generated as a hydrodeoxygenation reaction product of the glycerol backbone of triglycerides, thereby at least partially satisfying the overall hydrogen requirements of the hydropyrolysis reactor, a downstream hydroconversion reaction zone, or both.

The above and other aspects, features and advantages of the present disclosure will be apparent from the following detailed description of the illustrated embodiments thereof which are to be read in connection with the accompanying drawings.

BRIEF DESCRIPTION OF THE DRAWINGS

A more complete understanding of the exemplary embodiments of the present disclosure and the advantages thereof may be acquired by referring to the following description in consideration of the accompanying figures, in which the same reference numbers, or reference numbers in which the last two digits are the same indicate like features and wherein:

FIGS. 1-5 should be understood to present an illustration of the disclosure and/or principles involved. Simplified process flow schemes are used, in order to facilitate explanation and understanding. Details including pumps, heaters and some heat exchangers, valves, instrumentation, and other items not essential to the understanding of the disclosure are not shown. As is readily apparent to one of skill in the art having knowledge of the present disclosure, methods for providing hydroprocessed biofuels according to various other embodiments of the disclosure involving co-processing of feedstocks, may have configurations and components determined, in part, by the properties desired of the liquid products obtained and/or the properties of the particular biomass-containing feedstock or co-feed used.

DETAILED DESCRIPTION

Figure 1:
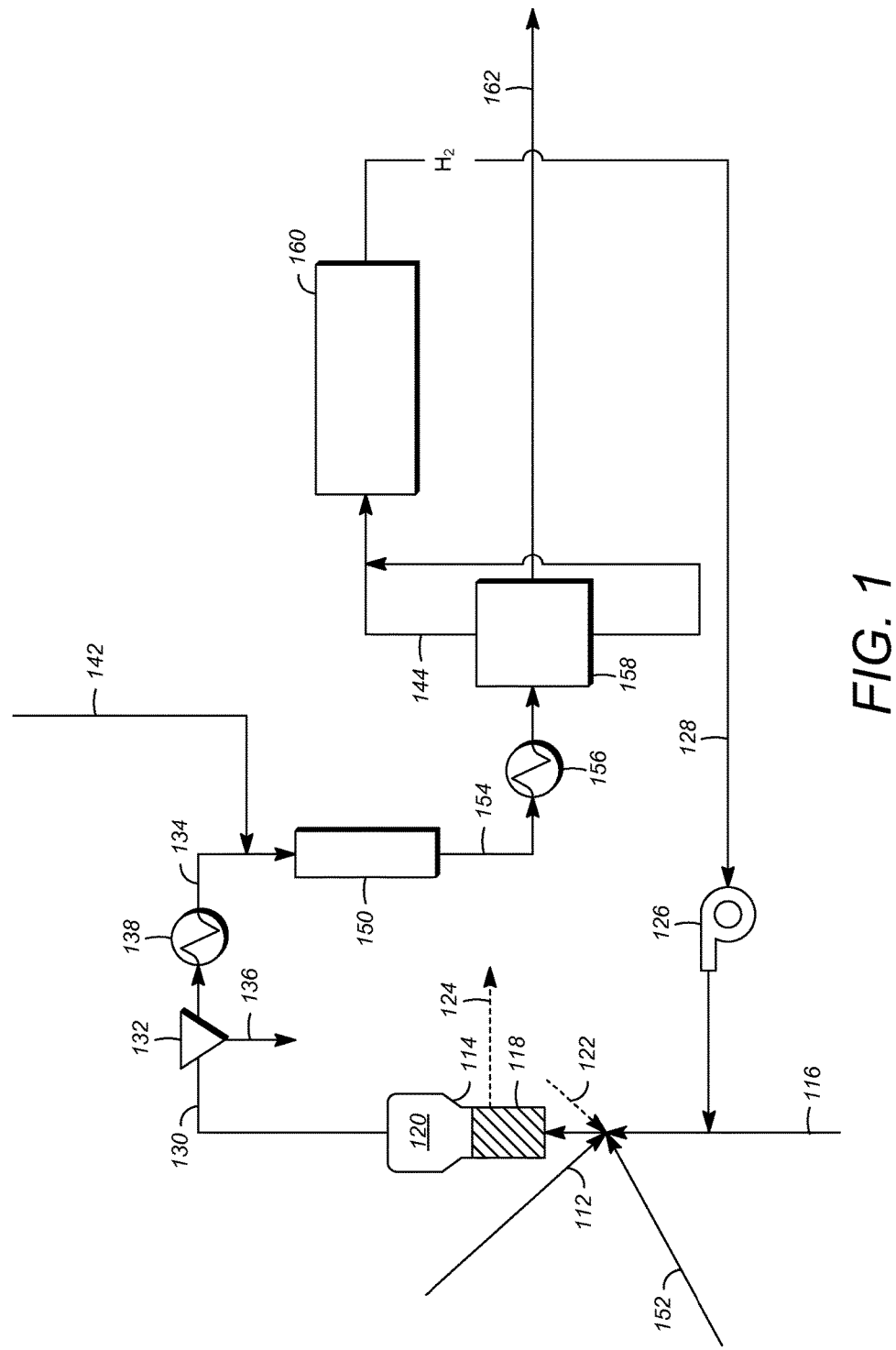
FIG. 1 is a schematic flow diagram of a hydropyrolysis process for producing liquid fuels from the co-processing of biomass, according to one embodiment of this disclosure.

Aspects of the present disclosure exploit particular, unexpected advantages associated with the ability to co-process a wide variety of both renewable and non-renewable feedstocks under conditions present in a hydropyrolysis reactor vessel, including temperature, total pressure, hydrogen partial pressure, catalyst type, and solid particle bed fluidization, as used for the hydropyrolysis of biomass. Unlike conventional pyrolysis, which does not benefit from the use of elevated hydrogen partial pressure and a deoxygenating catalyst to promote hydrodeoxygenation of the biomass-containing feedstock, an exemplary hydropyrolysis reactor vessel and associated conditions allow co-processing of aliphatic hydrocarbon precursors and/or aromatic hydrocarbon precursors, as described herein, to upgrade these components (i.e., co-feeds) by deoxygenation.

In some cases, operational synergies may be achieved, for example, in terms of localized or overall reactor temperature control, depending on the position and/or manner in which a particular aliphatic hydrocarbon precursor or aromatic hydrocarbon precursor is introduced to the hydropyrolysis reactor vessel. In other cases, aliphatic hydrocarbon precursors and/or aromatic hydrocarbon precursors, which could not be beneficially transformed via conventional pyrolysis, and in fact would be detrimental to this operation, may be effectively upgraded in a hydropyrolysis reactor vessel, in a manner that renders them suitable for processing in a subsequent hydroconversion zone. A fixed bed hydroconversion reactor, which is often used for this purpose, generally cannot tolerate solids that are present in some feedstocks that would otherwise be desirably co-processed. An example of such a feedstock is brown grease, which is also a representative aliphatic (paraffinic) hydrocarbon precursor. By first subjecting brown grease or other solids-containing feedstock to hydropyrolysis in a fluidized bed, solid particulates may be effectively transformed (e.g., devolatilized) and then removed, together with char that is formed from the biomass-containing feedstock, which is generally itself introduced to the hydropyrolysis reactor vessel in solid particulate form. Depending on the physical properties of solid particulates in a given co-feed (e.g., size and density), they might not elutriate with char but instead remain within a fluidized particle bed in the hydropyrolysis reactor. In this case, the accumulation of the solid particulates may be effectively managed by varying the rate of withdrawal of spent deoxygenating catalyst (containing a portion of solid particulates), which may be replaced by fresh deoxygenating catalyst. Whether or not solid contaminants are elutriated, their removal upstream of a hydroconversion reactor may significantly reduce or even eliminate the risk of plugging in this reactor.

The same advantages, described above with respect to aliphatic hydrocarbon precursors and/or aromatic hydrocarbon precursors that contain solids, also apply to such feedstocks that are predominantly in the form of solids and therefore would not be suitable for direct introduction into a fixed bed hydroconversion reactor. A representative, solid aliphatic hydrocarbon precursor is solid (e.g., dried and granulated) algae. A representative, solid aromatic hydrocarbon precursor is solid (e.g., dried and granulated) lignin.

Likewise, hydroconversion catalysts often cannot tolerate a number of contaminants that may be present in aliphatic hydrocarbon precursors or aromatic hydrocarbon precursors as described herein, such as metals including alkali and alkaline earth metals, halogenated compounds (e.g., chloride-containing compounds), as well as phosphorous, all of which may act as reversible or irreversible poisons of such catalysts. A number of pretreatment steps are possible for improving the quality of aliphatic hydrocarbon precursors or aromatic hydrocarbon precursors, such that they may be effectively deoxygenated in the presence of hydroconversion catalysts, without an unacceptably high rate of catalyst activity loss. Such pretreatment steps may include, for example, (i) the distillation of tall oil, which is an exemplary aromatic hydrocarbon precursor, to remove pitch and thereby provide a depitched tall oil, (ii) alkali refining of plant oils such as canola oil, which is an exemplary aliphatic hydrocarbon precursor, to remove metals and metalloids, such as phosphorous, and (iii) filtration, guard bed treatment, and/or washing of other aliphatic hydrocarbon precursors or aromatic hydrocarbon precursors, including non-renewable (e.g., petroleum derived) fractions.

Therefore, in exemplary embodiments, pretreatment that would normally be required before the introduction of certain co-feeds, for example those having a total metals content, or otherwise a alkali or alkaline earth metals content, of greater than 10 ppm by weight (and in some cases greater than 100 ppm by weight), to a fixed-bed hydroconversion reactor vessel, may be advantageously avoided by their prior introduction into the hydropyrolysis reactor. Using this reactor, the content of species that would otherwise be detrimental to the hydroconversion catalyst may be significantly reduced, for example by the preferential adsorption of these species onto deoxygenating catalyst and/or char particles present in the hydropyrolysis reactor vessel, or otherwise onto solid scavengers that are selective for the adsorption of these detrimental species. Removal of metals and/or other unwanted contaminants is then achieved by the separation of char and/or spent catalyst from the partially deoxygenated hydropyrolysis product that is subsequently passed to the hydroconversion reaction zone. That is, these species may be removed in the same manner as described above with respect to solid contaminants that may be present in a given aliphatic hydrocarbon precursor or aromatic hydrocarbon precursor. To the extent that any contaminants of these co-feeds may act as poisons of the deoxygenating catalyst, fluidized bed operation of the hydropyrolysis reactor vessel allows for the effective management of such contaminants. In particular, both the feed rate of fresh deoxygenating catalyst to, and withdrawal of spent deoxygenating catalyst from, a fluidized catalyst bed contained in the hydropyrolysis reactor vessel, may be easily increased in response to an increased level of contaminants that, absent these increases in feed (addition) and withdrawal rates, would exhibit an increased rate of deactivation.

In further embodiments, particularly in the case of an aliphatic hydrocarbon precursor or an aromatic hydrocarbon precursor of poor quality in one or more respects, for example the presence of excessive quantities of deoxygenating catalyst poisons in the case of the byproduct of Kraft or sulfate processing known as black liquor, this feedstock may be subjected to pretreatment (e.g., devolatilization) in a pre-reactor, prior to the pretreated aliphatic hydrocarbon precursor or an aromatic hydrocarbon precursor being introduced to the hydropyrolysis reactor vessel.

Other aspects of the present disclosure exploit particular, unexpected advantages associated with co-processing an aliphatic hydrocarbon precursor or an aromatic hydrocarbon precursor, by its introduction into a hydroconversion reactor, downstream of the hydropyrolysis reactor, to obtain benefits that are not realized in conventional pyrolysis processes, whether or not such conventional processes are performed in conjunction with a downstream hydroprocessing step. In this regard, an important distinction between hydropyrolysis and conventional pyrolysis resides in the extent of oxygen removal achieved in partially deoxygenated products of the respective hydropyrolysis or pyrolysis reactor vessels. A partially deoxygenated hydropyrolysis product, for example representing a condensable liquid fraction of the output from the hydropyrolysis reactor vessel, may have a total oxygen content of less than about 15% by weight, compared to 30-40% by weight in the case of conventional pyrolysis oil (bio-oil). When such a partially deoxygenated hydropyrolysis product is further processed in a hydroconversion reaction zone (e.g., comprising a fixed bed hydroconversion reactor), the requirement for further deoxygenation, in the production of hydrocarbons as end products, may therefore be significantly reduced. This advantageously allows for simplified co-processing of the partially deoxygenated hydropyrolysis product with other feedstocks that, compared to the partially deoxygenated hydropyrolysis product (but not compared to a conventional pyrolysis oil) have a higher oxygen content. For example, a triglyceride-containing component typically has a total oxygen content as high as 25% by weight. By co-processing this component with the partially deoxygenated hydropyrolysis product, the total overall oxygen content of the co-processed feedstocks may be reduced (rather than increased, in the case of co-processing with a conventional pyrolysis oil) relative to the total oxygen content of the triglyceride-containing component. Importantly, this reduces the hydroconversion reaction exotherm and corresponding adiabatic temperature rise in a given hydroconversion reactor (used to achieve complete deoxygenation), assuming other processing variables are maintained constant.

Stated otherwise, the partially deoxygenated hydropyrolysis product advantageously acts as a heat sink to absorb at least a portion of the heat released from hydroconversion of the triglyceride-containing component or other aliphatic hydrocarbon precursor. In contrast, the co-processing of a conventional pyrolysis oil with the triglyceride component under the same conditions would increase (not reduce) the average and maximum catalyst temperatures. Those skilled in the art can therefore appreciate from the present disclosure that co-processing the partially deoxygenated hydropyrolysis product with a triglyceride-containing component in a hydroconversion zone may reduce the rate of detrimental coke production, thereby prolonging hydroconversion catalyst life and improving overall process economics in a manner that could not have been predicted based on knowledge of the present state of the art.

Moreover, the elevated hydrogen partial pressure environment in the hydropyrolysis reactor improves the quality of the partially deoxygenated hydropyrolysis product in other important respects. In addition to a reduced oxygen content relative to conventional pyrolysis oils (bio-oils), the partially deoxygenated hydropyrolysis product may also have a lower nitrogen content resulting from the hydrogenation of nitrogen-containing compounds to ammonia ($NH_3$). This product may also be rendered less chemically reactive due to the relatively lower content of organic acids and relatively higher content fully deoxygenated hydrocarbons, as a result of hydrogenation reactions that, by way of comparison, do not occur to any significant extent in conventional pyrolysis. All of these properties of the partially deoxygenated hydropyrolysis product improve its ability to be processed in a downstream hydroconversion reactor, in terms of reducing operating severity (e.g., temperature and/or hydrogen partial pressure) and the need for heat removal as a result of highly exothermic deoxygenation and denitrification reactions.

Yet further aspects of the present disclosure exploit particular, unexpected advantages of co-processing an aliphatic hydrocarbon precursor or an aromatic hydrocarbon precursor, in terms of meeting the overall hydrogen requirements of integrated hydropyrolysis processes as described herein, in which hydrogen is consumed in at least two reaction stages (e.g., in both a hydropyrolysis reactor and a hydroconversion reactor). For example, in a specific embodiment, an aliphatic hydrocarbon precursor is a triglyceride-containing component (e.g., a vegetable oil or an animal fat) that, when subjected to hydrodeoxygenation (e.g., in a hydropyrolyzing and/or hydroconverting step) yields propane as a result of deoxygenating the glycerol backbone of the triglyceride. Some, all, or substantially all of the propane, produced in this manner, may be recovered in a gaseous mixture, comprising non-condensable gases, from the output of a hydroconversion zone (e.g., a hydroconversion reactor in this zone). This propane may then, in turn, be used as a source of hydrogen for the hydropyrolysis reactor, the hydroconversion zone, or both, for example by subjecting this propane to steam reforming as described herein, together with other gases in the gaseous mixture.

Hydropyrolysis Process Summary

Hydropyrolysis processes include a hydropyrolyzing step that occurs in a hydropyrolysis reactor vessel containing hydrogen and a deoxygenating catalyst. As described herein, hydropyrolysis involves, generally, feeding hydrogen, a biomass-containing feedstock, and optionally a co-feed, to a hydropyrolysis reactor vessel, operating at elevated temperature and pressure and containing a deoxygenating catalyst (e.g., as a fluidized bed). A hydropyrolysis reactor output is produced, comprising a least one non-condensable gas (e.g., $CO$, $CO_2$, and/or $CH_4$), a partially deoxygenated hydropyrolysis product, and char particles. Representative processes further comprise, optionally following the removal of the char particles (e.g., external to the hydropyrolysis reactor vessel following their elutriation therefrom), hydroconverting at least a portion of the partially deoxygenated hydropyrolysis product in a hydroconversion zone comprising at least one hydroconversion reactor vessel containing a hydroconversion catalyst (e.g., as a fixed bed). As an alternative to, or in combination with, being introduced into the hydropyrolysis reactor vessel, a co-feed may optionally be introduced into a hydroconversion reactor vessel. In either event, a hydroconversion reactor output is produced, from which a substantially fully deoxygenated hydrocarbon liquid and a gaseous mixture may be recovered.

Various liquid products may be obtained as fractions of the substantially fully deoxygenated liquid (e.g., by fractional distillation). Such liquid products, as well as the substantially fully deoxygenated liquid itself, to the extent that they have a greater value (e.g., on a weight basis) than the biomass-containing feedstock, may be referred to as "higher value liquids," generated from the hydropyrolysis process. Representative higher value liquids may include individual compounds (e.g., levoglucosan), classes of compounds (e.g., aromatic hydrocarbons), and mixtures of compounds suitable for a particular purpose (e.g., gasoline, diesel, or jet fuel boiling-range hydrocarbons suitable for use as transportation fuels or otherwise for blending into such fuels).

Biomass and Biomass-Containing Feedstocks

"Biomass" refers to any solid plant material, or mixture of such plant materials, including any type of wood or paper product. Representative wood includes hardwood (e.g., whitewood), softwood, or a hardwood or softwood bark. Energy crops, or otherwise agricultural residues (e.g., logging residues) or other types of plant wastes or plant-derived wastes, may also be used as plant materials. Specific exemplary plant materials include corn fiber, corn stover, castor bean stalks, sugar cane bagasse, and sorghum, in addition to "on-purpose" energy crops such as switchgrass and miscanthus. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include carbohydrates (e.g., sugars), organic waste materials, such as waste paper, construction, demolition wastes, and biosludge.

A "biomass-containing" feedstock may comprise all or substantially all biomass as defined above, but may otherwise contain non-biological materials (e.g., materials derived from petroleum, such as plastics, or materials derived from minerals extracted from the earth, such as metals and metal oxides, including glass) in significant quantities (e.g., at least about 5% by weight, such as from about 5% to about 55% by weight, or at least about 25% by weight, such as from about 25% to about 45% by weight). An example of a "biomass-containing" feedstock that may comprise one or more non-biological materials is municipal solid waste (MSW).

Aliphatic Hydrocarbon Precursors as Co-Feeds

In representative embodiments, an aliphatic hydrocarbon precursor is co-processed, in a hydropyrolysis process as described above, by introducing this separate feedstock (or co-feed) into the hydropyrolysis reactor vessel, the hydroconversion reactor vessel, or both, to enhance an operating condition of either or both of these reactors, and/or otherwise enhance a property of the fully deoxygenated hydrocarbon liquid recovered from the hydroconversion reactor, as described above.

An "aliphatic hydrocarbon precursor" is a feedstock other than the biomass-containing feedstock, as defined above, although the aliphatic hydrocarbon precursor may itself be of a biological (rather than mineral or petroleum-based) origin and/or considered a source of biomass. The aliphatic hydrocarbon precursor, when subjected to processing in the hydropyrolysis reactor vessel and/or the hydroconversion reaction zone, yields a greater percentage of aliphatic (e.g., paraffinic) hydrocarbons relative to aromatic hydrocarbons, based on the weight of the aliphatic hydrocarbon precursor introduced into the process. An aliphatic hydrocarbon precursor is particularly useful in co-processing, by introduction into either the hydropyrolysis reactor vessel or a hydroconversion reactor vessel, for enhancing the yield of a jet fuel boiling range fraction and/or a diesel boiling range fraction of the deoxygenated hydrocarbon liquid and/or increasing the cetane number of this fraction, as described more fully below.

Representative aliphatic hydrocarbon precursors include triglyceride-containing components, for example naturally occurring plant (e.g., vegetable) oils and animal fats, or mixtures of such oils and fats (e.g., waste restaurant oils or grease). Advantageously, the greenhouse gas (GHG) emissions associated with many of these components (as co-feeds) are considered negligible, as these biofuel sources are otherwise normally waste products of foods already produced for human and animal consumption. As understood in the art, calculated GHG emissions are based on a lifecyle assessment (LCA) from the time of cultivation of the feedstock sources (in the case plant oils), up to and including the ultimate combustion of the liquid products, obtained from processing these feedstocks. Triglyceride-containing components typically contain both free fatty acids and triglycerides, with the possible additional presence of monoglycerides and diglycerides. Triglyceride-containing components may also include those containing derivative classes of compounds such as fatty acid alkyl esters (FAAE), which embrace fatty acid methyl esters (FAME) and fatty acid ethyl esters (FAEE).

Examples of plant oils include rapeseed (including canola) oil, corn oil, colza oil, crambe oil, sunflower oil, soybean oil, hempseed oil, olive oil, linseed oil, mustard oil, palm oil, peanut oil, castor oil, coconut oil, jatropha oil, camelina oil, cottonseed oil, salicornia oil, pennycress oil, algal oil, and other nut oils, and mixtures thereof. Examples of animal fats include lard, offal, tallow, train oil, milk fat, fish oil, sewage sludge, and/or recycled fats of the food industry, including various waste streams such as yellow and brown greases. Mixtures of one or more of these animal fats and one or more of these plant oils may also be used as an aliphatic hydrocarbon precursor. The triglycerides and free fatty acids of a typical plant oil, animal fat, or mixtures thereof, may include aliphatic hydrocarbon chains in their structures, as described above, with the majority of these chains having from about 8 to about 24 carbon atoms. Representative plant oils and/or animal fats, used as a triglyceride-containing component, may include significant proportions (e.g., at least about 30%, or at least about 50%) of aliphatic (e.g., paraffinic or olefinic) hydrocarbon chains with 16 and 18 carbon atoms. Triglyceride-containing components may be liquid or solid at room temperature. Certain solid aliphatic hydrocarbon precursors, such as solid granulated algae that is optionally dried to a low moisture content, may be suitable as co-feeds for direct introduction into the hydropyrolysis reactor vessel.

Representative triglyceride-containing components, including plant oils and animal fats, either in their crude form or pretreated, typically have a total oxygen content of about 10-12% by weight. As described above, the condensable, partially deoxygenated hydropyrolysis product exiting the hydropyrolysis reactor, in some embodiments, may have a lower oxygen content, for example less than about 10%, less than about 5%, or even less than about 3% by weight, such that this product, when combined with a triglyceride-containing component or other aliphatic hydrocarbon precursor or aromatic hydrocarbon precursor that is introduced to a hydroconversion reactor, acts as a diluent of the total oxygen (i.e., provides a combined feedstock with a lower total oxygen content than that of the aliphatic hydrocarbon precursor or aromatic hydrocarbon precursor), thereby reducing the temperature rise within the hydroconversion reactor. As a consequence, the rate of formation of catalyst coke is beneficially reduced, which becomes increasingly important near the end of the hydroconversion catalyst life, when catalyst bed temperatures typically must be raised to maintain activity. According to other embodiments, the partially deoxygenated hydropyrolysis product may have other contents of total oxygen, for example more generally in the range from about 2% to about 30% by weight, typically in the range from about 5% to about 25% by weight, but often less than 15% by weight. Nevertheless, oxygen contents in these ranges are still below typical oxygen contents (e.g., about 40% by weight) of conventional pyrolysis oils (bio-oils) obtained from pyrolysis processes and therefore provide similar advantages in terms of ease of processing (e.g., reduced adiabatic temperature rise) in the hydroconversion zone.

In addition, as described above, the partially deoxygenated hydropyrolysis product may have a reduced content of total nitrogen as a result of hydrodenitrification reactions occurring in the hydropyrolysis reactor, with this content being dependent on the nitrogen content of the feedstock introduced to the hydropyrolysis reactor and operating conditions in this reactor. Compared to conventional pyrolysis in the substantial absence of hydrogen, the reduced nitrogen content of the partially deoxygenated hydropyrolysis product affords similar benefits in terms of greater ease of processing in the hydroconversion reactor, as described above with respect to its reduced oxygen content. Further benefits are obtained from the overall reduced chemical reactivity of the partially deoxygenated hydropyrolysis product, relative to conventional bio-oils, which reduces the occurrence of undesirable side reactions, for example those which form coke precursors, in the hydroconversion reactor.

Another representative aliphatic hydrocarbon precursor is a product of a Biomass to Liquid (BTL) pathway, which may be a product of Fischer-Tropsch (F-T) synthesis. Such aliphatic hydrocarbon precursors include the products of gasification, followed by F-T synthesis, and these products are generally of significantly lower quality, compared to their counterpart, paraffin-rich petroleum derived products used for fuel blending. This quality deficit results from the presence of aliphatic alcohols and other oxygenate byproducts, as well as possibly reactive olefins, with amounts of these non-paraffinic impurities depending on the F-T catalyst system and processing conditions used. Representative total oxygen contents of F-T synthesis products are typically in the range from about 0.25% to about 10%, and often from about 0.5% to about 5% by weight. In addition, products of F-T synthesis, including F-T waxes, have a wide carbon number (and consequently molecular weight) distribution and very poor cold flow properties. Both of these characteristics may be improved using appropriate transformations in the hydroconversion zone, including hydrocracking, as a specific hydroprocessing reaction, to convert F-T waxes into a paraffin-rich component, with a lower average molecular weight (and narrower molecular weight distribution) and/or hydroisomerization, as another specific hydroprocessing reaction, to achieve a greater degree of branching (or content of isoparaffins), in order to meet specifications for distillate fuel fractions of the substantially fully deoxygenated hydrocarbon liquid, such as a diesel boiling range fraction and/or an aviation (e.g., jet) fuel boiling range fraction.

Gasification (e.g., non-catalytic partial oxidation) of a wide variety of carbonaceous feedstocks may provide the syngas used for F-T synthesis. Preferably, the syngas is obtained from gasification of biomass as defined above, although other suitable gasification feedstocks that do not necessarily include renewable carbon may also be used. If the F-T synthesis product is not derived from renewable carbon, then the renewable carbon of the substantially fully deoxygenated hydrocarbon liquid may be only that portion of the total carbon in this liquid that is obtained from the biomass of the biomass-containing feedstock, as described above. Carbonaceous feedstocks that are capable of being gasified to a mixture of hydrogen and carbon monoxide (syngas) include coal (e.g., anthracite, brown coal, bituminous coal, sub-bituminous coal, lignite, and petroleum coke), bituminous oils, mineral crude oil or fractions (e.g., resids) thereof, and methane containing feedstocks (e.g., refinery gas, coal bed gas, associated gas, and natural gas). Processes for converting such feedstocks to syngas are described, for example, in "Gasification" by C. Higman and M van der Burgt, Elsevier Science (USA), 2003, ISBN 0-7506-7707-4, Ch. 4 and 5F-T synthesis products, as aliphatic hydrocarbon precursors, may therefore by derived from a Coal to Liquid (CTL) or Natural Gas to Liquid (GTL) pathway.

F-T synthesis refers to a process for converting syngas, namely a mixture of CO and $H_2$, into hydrocarbons of advancing molecular weight according to the reaction:

$$n(CO+2H_2) \rightarrow (-CH_2-)_n + nH_2O + \text{heat}.$$

The F-T synthesis reaction generates reaction products having a wide range of molecular weights, from that of methane to those of heavy paraffin waxes. The particular mixture of generally non-cyclic paraffinic and olefinic hydrocarbons, as well as the proportions of these reaction products, are governed substantially by the catalyst system used. Normally, the production of methane is minimized and a substantial portion of the hydrocarbons produced have a carbon chain length of a least 5 carbon atoms. Therefore, $C_5^+$ hydrocarbons are present in the F-T synthesis product in an amount generally of at least about 60% (e.g., from about 60% to about 99%), and typically at least about 70% (e.g., from about 70% to about 95%) by weight. The F-T synthesis product may be pretreated for the removal of light hydrocarbons (e.g., $C_1$-$C_4$ hydrocarbons) and water. However, since these components are well-tolerated in hydropyrolysis processes described herein, and are even beneficial in some cases (e.g., for the production of required hydrogen via reforming), raw products of F-T synthesis (i.e., without pretreatment) may also be used as aliphatic hydrocarbon precursors. Such raw products may have a combined, $C_1$-$C_4$ hydrocarbon and oxygenated hydrocarbon content of greater than about 1% by volume, and even greater than 5% by volume.

As in the case of certain F-T synthesis products, other types of crude or low-quality aliphatic hydrocarbon precursors, for example particular triglyceride-containing components such as brown grease, may be pretreated. Brown grease includes solid particulates such as rotten food particles. Crude triglyceride-containing components may otherwise include phospholipids (gums) and metal contaminants, including alkali and alkaline earth metals. Due to a high solids content, high hydroconversion catalyst poison content, and/or propensity to cause hydroconversion catalyst plugging, low-quality and/or crude triglyceride-containing components may be unsuitable for introduction into a fixed-bed hydroconversion reactor vessel. When used for this purpose, therefore, such triglyceride-containing components may be pretreated to reduce the content of solids or other of these undesirable materials. Advantageously, however, such triglyceride-containing components may also be introduced, according to some embodiments, directly into the hydropyrolysis reactor without such pretreatment steps, such that this reactor itself may perform the necessary pretreatment, allowing the partially deoxygenated hydropyrolysis product, including products of the hydropyrolysis of low-quality and/or crude triglyceride-containing components, to be further processed in the hydroconversion zone in an effective manner. Representative triglyceride-containing components that may be processed directly in the hydropyrolysis reactor include those that have a total chloride or metals content, and in some cases a total alkali metal and alkaline earth metal content, of greater than about 10 ppm (e.g., from about 10 ppm to about 500 ppm), or greater than about 25 ppm (e.g., from about 25 ppm to about 250 ppm). Such levels of contaminant chloride or metals, and particularly alkali and alkaline earth metals, are detrimental to the activity of many types of hydroprocessing catalysts.

Pretreatment of aliphatic hydrocarbon precursors may also be performed in a pre-reactor as described herein, upstream of a hydropyrolysis reactor, and may involve devolatilization of such co-feeds, prior to their co-processing in the hydropyrolysis reactor and/or hydroconversion reactor, with biomass-containing feedstocks as described herein. Devolatilization may be accompanied by other, beneficial transformations of a pretreated aliphatic hydrocarbon precursor, for example to reduce corrosive species content, reduce hydropyrolysis catalyst poison content (e.g., reduce sodium), and/or a reduce hydroconversion catalyst poison content. Pretreatment of the aliphatic hydrocarbon precursor in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the pretreated co-feed. Suitable solid bed materials include those having dual or multiple functions. In the case of a pretreating catalyst, those having activity for hydroprocessing of the biomass-containing feedstock, described herein, are representative.

Aromatic Hydrocarbon Precursors as Co-Feeds

In representative embodiments, an aromatic hydrocarbon precursor is co-processed, in a hydropyrolysis process as described above, by introducing this separate feedstock (or co-feed) into the hydropyrolysis reactor vessel, the hydroconversion reactor vessel, or both, to enhance an operating condition of either or both of these reactors, and/or otherwise enhance a property of the fully deoxygenated hydrocarbon liquid recovered from the hydroconversion reactor, as described above.

An "aromatic hydrocarbon precursor" is a feedstock other than the biomass-containing feedstock, as defined above, although the aromatic hydrocarbon precursor may itself be of a biological (rather than mineral or petroleum-based) origin and/or considered a source of biomass. The aromatic hydrocarbon precursor, when subjected to processing in the hydropyrolysis reactor vessel and/or the hydroconversion reaction zone, yields a greater percentage of aromatic hydrocarbons (e.g., alkylbenzenes) relative to aliphatic hydrocarbons, based on the weight of the aromatic hydrocarbon precursor introduced into the process. An aromatic hydrocarbon precursor is particularly useful in co-processing, by introduction into either the hydropyrolysis reactor vessel or a hydroconversion reactor vessel, for enhancing the yield of a gasoline boiling point range fraction or a non-turbine aviation fuel boiling point range fraction of the deoxygenated hydrocarbon liquid and/or increasing the octane number of this fraction, as described more fully below.

Representative aromatic hydrocarbon precursors are derived from biomass (e.g., are products of conventional pyrolysis processes, including fast pyrolysis processes as described in U.S. Pat. No. 5,961,786; Canadian Patent Application 536,549; and by Bridgwater, A. V., "Biomass Fast Pyrolysis," Review paper BIBLID: 0354-9836, 8 (2004), 2, 21-49). Particular aromatic hydrocarbon precursors derived from biomass comprise a significant quantity, for example generally from about 5% to about 85%, and often from about 10% to about 75%, by weight of cyclic compounds, including cyclic organic oxygenates. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., naphthenic), completely unsaturated (e.g., aromatic), or partially unsaturated. After being subjected to hydroconversion in hydropyrolysis processes described herein, these cyclic compounds, including cyclic organic oxygenates, may contribute to the total aromatic hydrocarbon content of the substantially fully deoxygenated hydrocarbon liquid. These cyclic compounds are preferably obtained from natural sources, such as lignocellulosic biomass, as described above, that has been pyrolyzed to depolymerize and fragment the cyclic building blocks of cellulose, hemicellulose, and lignin.

A representative aromatic hydrocarbon precursor that is derived from biomass is conventional pyrolysis oil (bio-oil), containing significant quantities of cyclic compounds (e.g., generally from about 10% to about 90% by weight, and typically from about 20% to about 80% by weight), as described above, that are precursors to aromatic hydrocarbons. Pyrolysis oil contains often from about 30 to about 40%, by weight of total oxygen, for example in the form of both (i) organic oxygenates, such as hydroxyaldehydes, hydroxyketones, sugars, carboxylic acids, and phenolic oligomers, and (ii) dissolved water. For this reason, although a pourable and transportable liquid fuel, pyrolysis oil (and particularly raw pyrolysis oil that has not been pretreated) has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. In a hydropyrolysis process as described herein, pyrolysis oil may be further deoxygenated and undergo other transformations to yield hydrocarbons in the substantially fully deoxygenated hydrocarbon liquid exiting the hydroconversion zone. The co-processing of pyrolysis oil in a hydropyrolysis process as described herein is therefore beneficial in terms of reducing its oxygen content and decreasing its chemical reactivity (e.g., tendency to decompose), such that aromatic hydrocarbons derived from pyrolysis oil, may be concentrated in a liquid product following fractionation of the substantially fully deoxygenated hydrocarbon liquid, whereby the product is suitable for blending in fuels, such as gasoline, or otherwise is useful as such a fuel without blending (e.g., a gasoline boiling range fraction meeting one or more, and possibly all, applicable gasoline specifications).

Other representative aromatic hydrocarbon precursors derived from biomass include products generally resulting or obtained from the thermal and/or chemical transformation of biomass, as defined above, or biomass-containing feedstocks (e.g., MSW). These aromatic hydrocarbon precursors therefore include, but are not limited to, products of pyrolysis, torrefaction (e.g., torrefied and optionally densified wood), hydrothermal carbonization (e.g., biomass that is pretreated and densified by acid hydrolysis in hot, compressed water), and polymerization (e.g., organic polymers derived from plant monomers). Aromatic hydrocarbon precursors derived from biomass extend to pretreated feedstocks that result or are obtained from thermal and/or chemical transformation, prior to, or upstream of, their use as feedstocks (co-feeds) for a given conversion step (e.g., hydropyrolysis or hydroconversion). Specific types of pretreating steps that result in aromatic hydrocarbon precursors, which are biomass-derived products, include those as described herein. Representative pretreating steps may therefore use a pre-reactor, upstream of a hydropyrolysis reactor, and involve devolatilization and/or at least some hydropyrolysis of a biomass-containing feedstock. Certain pretreated feedstocks are biomass-derived products that may serve as aromatic hydrocarbon precursors, for co-processing in the hydropyrolysis reactor and/or hydroconversion reactor, with biomass-containing feedstocks as described herein.

Further specific examples of aromatic hydrocarbon precursors include byproducts of Kraft or sulfate processing for the conversion of wood into pulp. These byproducts include black liquor, tall oil, pure lignin, and lignin sulfonate. Tall oil refers to a resinous yellow-black oily liquid, which is namely an acidified byproduct of pine wood processing. Tall oil, prior to refining, is normally a mixture of rosin acids, fatty acids, sterols, high-molecular weight alcohols, and other alkyl chain materials. Distillation of crude tall oil may be used to recover a tall oil fraction that is enriched in the rosin acids, for use as an aromatic hydrocarbon precursor as described herein.

Naturally derived (e.g., non-fossil derived) oils rich in cyclic compounds, and therefore useful as aromatic hydrocarbon precursors as described herein, including pyrolysis oil, and Kraft or sulfate processing byproducts (e.g., black liquor, crude tall oil, and depitched tall oil), have a high oxygenate content that renders these products unsuitable for use as biofuels without deoxygenation. In the case of tall oil, for example, rosin acids (all multi-ring organic acids) are present in significant concentrations. Deoxygenation of these oxygenated cyclic compounds under hydropyrolysis and/or hydroprocessing conditions beneficially yields aromatic hydrocarbons. In combination with oxygen removal, ring saturation and/or ring opening of at least one ring (but not all rings) of the multi-ring compounds leads to the formation of naphthenic and/or alkylated cyclic hydrocarbons, respectively. Importantly, the naphthenic/aromatic hydrocarbon equilibrium under the particular hydropyrolysis and/or hydroconversion conditions used, may be used to govern the relative proportions of these species and thereby meet desired specifications for a particular application, for example the yield, or content, of aromatic hydrocarbons in a gasoline boiling range fraction or aviation fuel boiling range fraction, as needed to meet desired specifications (e.g., octane number in the case of gasoline specifications or aromatic hydrocarbon content in the case of aviation (non-turbine or jet) fuel specifications).

Yet further examples of aromatic hydrocarbon precursors include oils obtained from aromatic foliage such as eucalyptols. Also, certain solid aromatic hydrocarbon precursors, such as solid granulated lignin that is optionally dried to a low moisture content, are suitable as co-feeds for direct introduction into the hydropyrolysis reactor vessel.

The aromatic hydrocarbon precursor may be pretreated to improve its quality, prior to introduction into a hydropyrolysis process as described herein. Tall oil, for example, may be used either in its crude form or may otherwise be pretreated by distillation (e.g., vacuum distillation) to remove pitch (i.e., providing depitched tall oil) and/or concentrate the rosin acids, which are primarily abietic acid and dehydroabietic acid but include other cyclic carboxylic acids. The aromatic hydrocarbon precursor may in general be obtained by a pretreatment involving separation to remove unwanted materials, for example from a crude tall oil or a crude pyrolysis oil (bio-oil). In the case of crude bio-oil, for example, pretreatment by filtration and/or ion exchange may be used to remove solids and/or soluble metals, prior to introduction of the pretreated bio-oil to a hydropyrolysis reactor or hydroconversion reactor.

Therefore, as in the case of representative aliphatic hydrocarbon precursors described above (e.g., a triglyceride containing component or product of F-T synthesis), aromatic hydrocarbon precursors (e.g., raw pyrolysis oil, a byproduct of Kraft or sulfate processing, a biomass-derived product, or lignin) may be pretreated. Again, however, crude or low-quality aromatic hydrocarbon precursors, such as crude bio-oil or black liquor, may also be advantageously introduced, according to some embodiments, directly into the hydropyrolysis reactor without such pretreatment steps, such that this reactor itself may perform the necessary pretreatment, allowing the partially deoxygenated hydropyrolysis product, including products of the hydropyrolysis of crude or low-quality aromatic hydrocarbon precursors, to be further processed in the hydroconversion zone in an effective manner.

Pretreatment of aromatic hydrocarbon precursors may also be performed in a pre-reactor as described herein, upstream of a hydropyrolysis reactor, and may involve devolatilization of such co-feeds, prior to their co-processing in the hydropyrolysis reactor and/or hydroconversion reactor, with biomass-containing feedstocks as described herein. Devolatilization may be accompanied by other, beneficial transformations of a pretreated aromatic hydrocarbon precursor, for example to reduce corrosive species content, reduce hydropyrolysis catalyst poison content (e.g., reduce sodium), and/or reduce hydroconversion catalyst poison content. Pretreatment of the aromatic hydrocarbon precursor in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the pretreated co-feed. Suitable solid bed materials include those having dual or multiple functions. In the case of a pretreating catalyst, those having activity for hydroprocessing of the biomass-containing feedstock, described herein, are representative.

Other Co-Feeds

In addition to, or as an alternative to, any of the particular aliphatic hydrocarbon precursors and aromatic hydrocarbon precursors as described above, other co-feeds may likewise be co-processed, in a hydropyrolysis process as described above, by introduction into the hydropyrolysis reactor vessel, the hydroconversion reactor vessel, or both, to enhance an operating condition of either or both of these reactors, and/or otherwise enhance a property of the fully deoxygenated hydrocarbon liquid recovered from the hydroconversion reactor, as described above. Persons of ordinary skill in the art will recognize that in accordance with the disclosure a specific molecular structure of a given co-feed will dictate which such co-feeds are precursors to certain types of hydrocarbons (e.g., aliphatic or aromatic hydrocarbons) in the hydropyrolysis process.

Examples of other types of co-feeds include oxygenated polymers (e.g., plastics) that contain oxygen in the functional groups of their repeating monomeric substituents. The oxygen, as in the case of the biomass-containing feedstock and the aliphatic hydrocarbon precursors and aromatic hydrocarbon precursors as described above, is at least partly removed from such co-feeds in the hydropyrolysis and/or hydroconversion reactors, through the production of $H_2O$, CO, and/or $CO_2$. The remainder of the polymeric structure may be used to generate either aliphatic or aromatic hydrocarbons. Representative oxygenated plastics have an oxygen content of at least 10% by weight (e.g., in the range from about 10 to about 45% by weight), with specific examples of oxygenated plastic co-feeds being polycarbonates (e.g., $(C_{15}H_{16}O_2)_n$, approx. 14% by weight O), poly(methyl methacrylate) (PMMA, $(C_5H_8O_2)_n$, approx. 32% by weight O), polyethylene terephthalate (PET, $(C_{10}H_8O_4)_n$, approx. 33% by weight O), and polyamides (e.g., $(CONH_2)_n$, approx. 36% by weight O). Due to the presence of hydrocarbon ring structures in certain oxygenated polymers (e.g., PET and polycarbonates), these oxygenated polymers may serve as aromatic hydrocarbon precursors, whereas other oxygenated polymers may serve as aliphatic hydrocarbon precursors.

Such oxygenated polymers may also be present in the biomass-containing feedstock, for example in the case of municipal solid waste (MSW), as opposed to being present as a separate co-feed.

Enhancements Due to Co-Processing

As described above, co-processing of aliphatic hydrocarbon precursors and/or aromatic hydrocarbon precursors leads to enhancements in hydropyrolysis process operation and/or product properties, for example of the substantially fully deoxygenated hydrocarbon liquid, including liquid products obtained/separated from this liquid (e.g., by fractional distillation or fractionation). A number of advantages associated with co-processing such feedstocks with a biomass-containing feedstock, and particularly in hydropyrolysis processes, are described herein. Some of these advantages relate to the use of moderate hydrogen partial pressures (e.g., in the range from about 13.8 barg (200 psig) to about 34.5 barg (500 psig)), according to some embodiments, in a hydropyrolysis reactor and/or in at least one hydroconversion reactor of a hydroconversion zone. In the case of the hydropyrolysis reactor, this hydrogen partial pressure, in conjunction with a fluidized catalyst bed, provides an environment in which a wide variety of co-feeds, including those of relatively poor quality (e.g., containing solid impurities), are suitably upgraded for further processing in a hydroconversion zone. In addition, the production of a highly oxygenated, acidic bio-oil containing free radicals and polynuclear aromatic compounds (PNAs), which are problematic in downstream processing, is advantageously avoided.

With respect to enhancements in process operation, an aliphatic hydrocarbon precursor or aromatic hydrocarbon precursor may be introduced at any of a number of locations in either the hydropyrolysis reactor or a hydroconversion reactor to adjust the reactor temperature profile, for example by remediating local "hot spots," limiting the total temperature rise, and/or limiting the maximum catalyst temperature. All of such enhancements may prolong catalyst life and/or maintain operation within thermal boundaries that promote desired or optimal product properties or yields. According to particular embodiments, operational enhancements achieved by introducing a co-feed as described herein (e.g., in comparison to operating under the same conditions, but without the co-feed), include a reduced temperature rise (or difference between the highest and lowest catalyst bed temperatures) or a reduced maximum temperature in either the hydropyrolysis reactor vessel or a hydroconversion reactor vessel in which the co-feed is processed. For example, the temperature rise or maximum temperature may be reduced by at least about 5° C. (9° F.) (e.g., a reduction in the range from about 5° C. (9° F.) to about 50° C. (90° F.)), by at least about 10° C. (18° F.) (e.g., a reduction in the range from about 10° C. (18° F.) to about 35° C. (63° F.)), or by at least about 15° C. (27° F.) (e.g., a reduction in the range from about 15° C. (27° F.) to about 30° C. (54° F.)).

With respect to enhancements in properties, co-processing with an aliphatic hydrocarbon precursor or an aromatic hydrocarbon precursor, as described herein, may lead to an increased yield of a desired fraction of the substantially fully deoxygenated hydrocarbon liquid (e.g., a fraction of this liquid within a certain boiling range) and/or an increased quality of such a fraction.

Advantageously, according to some embodiments, the addition rate of a given co-feed may be adjusted in response to either a measured yield or measured quality of the substantially fully deoxygenated hydrocarbon liquid, or fraction thereof. Otherwise, the addition rate of a given co-feed may be adjusted in response to a desired change in the yield or quality of the substantially fully deoxygenated hydrocarbon liquid, or fraction thereof. For example, the feed rate of an aliphatic hydrocarbon precursor, as described herein, may be increased (or decreased) in response to a need (either based on a measurement or desired change) for an increased (or decreased) yield or an increased (or decreased) cetane number of a diesel boiling range fraction of the substantially fully deoxygenated hydrocarbon liquid. Likewise, the feed rate of an aromatic hydrocarbon precursor, as described herein, may be increased (or decreased) in response to a need (either based on a measurement or desired change) for an increased (or decreased) yield or an increased (or decreased) octane number of a gasoline boiling range fraction or a jet fuel boiling range fraction of the substantially fully deoxygenated hydrocarbon liquid.

In general, the co-processing, in either or both of the hydropyrolysis reactor or hydroconversion reactor, of an aliphatic hydrocarbon precursor in conjunction with the biomass-containing feedstock, leads to an enhanced yield or an enhanced cetane number of a diesel boiling range fraction, obtained from fractionation of the substantially fully deoxygenated hydrocarbon liquid. In this regard, representative aliphatic hydrocarbon precursors may more specifically enhance the yield, in this liquid obtained from the hydroconversion zone, of $C_8$-$C_{24}$ normal-paraffinic hydrocarbons obtained from the deoxygenation of naturally occurring plant oils and animal fats. However, if the hydroconversion zone includes a hydroisomerization reactor vessel, then representative aliphatic hydrocarbon precursors may enhance the yield, in this liquid, of $C_{10}$-$C_{24}$ combined, normal-paraffinic and iso-paraffinic hydrocarbons, whereby the iso-paraffinic hydrocarbons obtained from hydroisomerization may improve the cold flow properties of the diesel boiling range fraction.

In some cases, the degree of enhancement of the yield or cetane number bears a direct relationship to the increase in the rate of addition an aliphatic hydrocarbon precursor. The enhancement in yield of a diesel boiling range fraction may, for example, correspond to an increase of at least 30% by weight (e.g., from about 30% to about 95% by weight), on the basis of the added aliphatic hydrocarbon precursor (i.e., at least about 30% by weight of this added co-feed is recovered in a diesel boiling range fraction). According to other embodiments the enhancement in yield may correspond to an increase of at least 50% by weight (e.g., from about 50% to about 85% by weight), on the basis of the added aliphatic hydrocarbon precursor. Because the addition of differing aliphatic hydrocarbon precursors may lead to the production of hydrocarbons having differing chain lengths, these representative yield increases, on the basis of the added aliphatic hydrocarbon precursor, may alternatively correspond to increases in the yield of a kerosene boiling range fraction or a jet fuel boiling range fraction. Alternatively, the enhancement in cetane number of a diesel boiling range fraction may correspond to an increase in cetane number of at least about 3 (e.g., from about 3 to about 20), or at least about 5 (e.g., from about 5 to about 10).

According to other embodiments, the co-processing, in either or both of the hydropyrolysis reactor or hydroconversion reactor, of an aromatic hydrocarbon precursor in conjunction with the biomass-containing feedstock, leads to an enhanced yield or an enhanced octane number of a gasoline boiling range fraction of the substantially fully deoxygenated hydrocarbon liquid. The degree of enhancement of the yield or octane number may bear a direct relationship to the increase in the rate of addition an aromatic hydrocarbon precursor. The enhancement in yield of a gasoline boiling range fraction may, for example, correspond to an increase of at least 20% by weight (e.g., from about 30% to about 90% by weight), on the basis of the added aromatic hydrocarbon precursor (i.e., at least about 20% by weight of this added co-feed is recovered in a gasoline boiling range fraction). According to other embodiments the enhancement in yield may correspond to an increase of at least 35% by weight (e.g., from about 35% to about 80% by weight), on the basis of the added aromatic hydrocarbon precursor. Because the addition of differing aromatic hydrocarbon precursors may lead to the production of hydrocarbons having differing molecular weights, these representative yield increases, on the basis of the added aromatic hydrocarbon precursor, may alternatively correspond to increases in the yield of a non-turbine aviation fuel boiling range fraction. Alternatively, the enhancement in octane number of a gasoline boiling range fraction may correspond to an increase in octane number of at least about 3 (e.g., from about 3 to about 20), or at least about 5 (e.g., from about 5 to about 10).

Various fractions of the substantially fully deoxygenated hydrocarbon liquid, as described herein, may be characterized by, or separated based on, their boiling point ranges (e.g., may be separated based on their relative volatility, in a distillation column capable of carrying out a suitable number of theoretical stages of equilibrium contacting between rising vapor and falling liquid). In representative embodiments, a non-turbine aviation fuel boiling range fraction may have an initial boiling point (or "front-end") temperature characteristic of $C_5$ hydrocarbons, for example from about 30° C. (86° F.) to about 40° C. (104° F.), with a representative value being 35° C. (95° F.) and a distillation end point temperature generally from about 138° C. (280° F.) to about 300° C. (572° F.), and typically from about 145° C. (293° F.) to about 288° C. (550° F.), with a representative value being 215° C. (419° F.). These initial boiling point temperature ranges are also characteristic of a naphtha or gasoline boiling range fraction, but the distillation end point temperature range for this fraction is generally less, for example in the range from about from about 110° C. (230° F.) to about 149° C. (300° F.), and typically from about 121° C. (250° F.) to about 143° C. (290° F.), with a representative value being 130° C. (266° F.). A diesel boiling range fraction, or jet fuel boiling range fraction, may have an initial boiling point temperature in the range from about 120° C. (248° F.) to about 160° C. (320° F.)), with a representative value being 149° C. (300° F.). The distillation end point of a diesel boiling range fraction is generally in the range from about 300° C. (572° F.) to about 400° C. (752° F.)), with a representative value being 370° C. (698° F.). A kerosene boiling range fraction may have an initial boiling point temperature in the range from about 140° C. (284° F.) to about 160° C. (320° F.)), with a representative value being 150° C. (302° F.). The distillation end point of a kerosene boiling range fraction is typically in the range from about 265° C. (509° F.) to about 285° C. (545° F.)), with a representative value being 275° C. (527° F.). These boiling point temperatures, which are also characteristic of respective petroleum derived diesel, naphtha, gasoline, kerosene, and aviation (e.g., jet) fuel boiling range fractions, may be measured according to ASTM D86, with the end point being the 95% recovery value. Jet fuel boiling range fractions will preferably comply with ASTM D7566, entitled "Standard Specification for Aviation Turbine Fuel Containing Synthesized Hydrocarbons."

Following fractionation of the substantially fully deoxygenated hydrocarbon liquid, the resulting liquid products may be used as biofuels in neat form (e.g., as a diesel fuel) or otherwise blended, for example, with conventional petroleum derived blending stocks. Whether or not a given biofuel is blended, the carbon footprint of the resulting neat biofuel or blended biofuel may be reduced, relative to a conventional (entirely petroleum derived) fuel counterpart. By virtue of co-processing with an aliphatic hydrocarbon precursor or aromatic hydrocarbon precursor as described herein, the biofuel, or liquid product recovered by fractionation of the substantially fully deoxygenated hydrocarbon liquid, may meet all applicable standards for a given fuel component. For example, a diesel boiling range fraction may be rendered an "on-spec" diesel fuel as a result of co-processing with an aliphatic hydrocarbon precursor (e.g., a triglyceride containing component), whereas diesel fuel specification would not have been met without such co-processing. Such a diesel boiling range fraction may therefore comply with applicable specifications of minimum cetane number (or minimum cetane index, e.g., 41), maximum contents of water (e.g., 0.05 wt-%) and sulfur (e.g., 15 ppm), and maximum cold filter plugging point and cloud point temperature (e.g., −12° C. or −10° F.). Likewise, a gasoline or aviation fuel boiling range fraction may be rendered "on-spec" as a result of co-processing with an aromatic hydrocarbon precursor. In the case of a gasoline boiling range fraction, the requirement of minimum motor octane number (e.g., 82), maximum contents of water (e.g., 0.05 wt-%), sulfur (e.g., 50 ppm), and benzene (e.g., 3.8 vol-%) may be met. In the case of an aviation fuel boiling range fraction, the requirements for aromatic hydrocarbons, for proper elastomeric engine seal and gasket performance (e.g., from about 3% to about 25%, often from about 10% to about 20%, by volume) may be met, in addition to the requirement for maximum total oxygen (e.g., 0.5 wt-%) to meet ASTM thermal stability specifications. Advantageously, due to the nature of the cyclic compounds of the aromatic hydrocarbon precursors derived from renewable sources (e.g., lignin or tall oil), the aromatic hydrocarbons in the resulting gasoline or aviation fuel boiling range fractions generally include only minor amounts of benzene and toluene.

In general, the above liquid products, obtained from fractionation of the substantially fully deoxygenated hydrocarbon liquid (as well as this liquid itself) may have a low content of total oxygen, for example, less than about 3% by weight, less than about 2% by weight, less than about 1% by weight, less than about 5000 ppm by weight, less than about 2000 ppm by weight, and even less than about 1000 ppm by weight. Typically, the total oxygen content is in the range from about 0.001% to about 2% by weight, as a result of the substantially complete deoxygenation achieved following hydroconversion, with only those organic oxygenates remaining that are the most refractory under hydroprocessing conditions. Consequently, the fuel values of such liquid products may be considerably increased, relative to bio-oil. The hydrocarbon content of such liquid products may often be at least about 98% by weight, and in many cases at least about 99% or at least about 99.5% by weight. The low oxygen content of the substantially fully deoxygenated hydrocarbon liquid (as well as fractions thereof) renders it easily phase separable from condensed water. Advantageously, any net condensed water produced in an integrated process may have a low content of dissolved total organic carbon (TOC), generally less than about 5000 wt-ppm, typically less than about 2000 wt-ppm, and often less than about 500 wt-ppm.

Overall, it can be appreciated that co-processing as described herein may provide liquid products obtained at least partly, but often completely, from renewable carbon, which meet a number of important product specifications (e.g., cetane index and cold flow properties in the case of a diesel boiling range fraction, motor octane number in the case of a gasoline boiling range fraction, or aromatic hydrocarbon content in the case of an aviation fuel boiling range fraction). Therefore, according to some embodiments, blending of such liquid products with petroleum derived fuel and/or further processing, is not required to achieve an "on-spec" fuel.

Further Details of Representative Hydropyrolysis Processes, Including Pretreating As described above, it is also possible to feed a biomass-containing feedstock of co-feed that is a pretreated feedstock, obtained after having been subjected to a pretreating step, for example a physical classification to improve at least one characteristic, such as a reduced non-biological material content (e.g., content of glass, metals, and metallic oxides, including all mineral forms), a reduced average particle size, a reduced average particle aerodynamic diameter, an increased average particle surface area to mass ratio, or a more uniform particle size. In the case of a pretreated feedstock having been devolatilized and/or partially hydropyrolyzed, the vapors obtained from a pre-reactor, i.e., a pre-reactor vapor stream or purified pre-reactor vapor stream obtained following the removal of solids (e.g., char or solid bed material, such as catalyst) may be fed to the hydropyrolysis reactor vessel. The pre-reactor vapor stream or purified pre-reactor vapor stream may contain hydrogen, if hydrogen is utilized initially to carry out devolatilization and/or limited hydropyrolysis in the pre-reactor. Therefore, the pre-reactor vapor stream, or purified pre-reactor vapor stream, may provide some or all of the hydrogen that is fed to the hydropyrolysis reactor, or at least some, and possibly all, of the chemical hydrogen requirement for hydropyrolysis.

As noted above, hydropyrolysis produces a hydropyrolysis reactor output comprising at least one non-condensable gas, a partially deoxygenated hydropyrolysis product (e.g., in the form of a condensable vapor) and solid char particles. In many cases, the hydropyrolysis reactor output may comprise, in addition to $CO_2$, at least one other non-condensable gas (e.g., $H_2$, CO, and/or $CH_4$). However, depending on the methanation activity and water-gas shift conversion activity of the deoxygenating catalyst, more or less methane ($CH_4$) may be produced at the expense of CO, $CO_2$, and $H_2$. As used herein, the "partially deoxygenated hydropyrolysis product" of the hydropyrolyzing step may comprise oxygenated hydrocarbons (e.g., derived from cellulose, hemicellulose, and/or lignin) that may be subjected to more complete deoxygenation (e.g., to produce hydrocarbons and remove the oxygen in the form of CO, $CO_2$, and/or water) in a subsequent (downstream) hydroconversion zone. The term "partially deoxygenated hydropyrolysis product," however, does not preclude the presence of some amount of hydrocarbons (e.g., aromatic hydrocarbons such as alkylbenzenes) that are fully deoxygenated and thus cannot be further deoxygenated.

The hydropyrolysis reactor vessel, as in the case of an upstream, pre-reactor vessel, may contain a fluidized bed of deoxygenating catalyst. The fluidizing gas for the hydropyrolysis reactor vessel may comprise hydrogen present in a hydrogen-containing hydropyrolysis feed stream and/or possibly a purified pre-reactor vapor stream, either or both of which may be fed to this vessel. Following the hydropyrolyzing step, representative processes may further comprise removing all or substantially all (e.g., at least about 99%, or even at least about 99.9%) of the char particles and/or other solid particles (e.g., catalyst fines) from the hydropyrolysis reactor output to provide a hydropyrolysis reactor vapor having a reduced char content. The removal of char particles, such as those that may be entrained in the hydropyrolysis reactor output, may be particularly important in processes in which the products of hydropyrolysis, including the hydropyrolysis reactor vapor or a portion thereof, are subjected to a fixed bed catalytic conversion process. As described above, the removal of char particles may have the added benefit of removing, from the total hydropyrolysis reactor output, catalyst poisons (e.g., alkali and alkaline earth metals) that selectively adsorb onto the char particles.

According to some embodiments, it may be possible to cool and condense the hydropyrolysis reactor vapor, in order to recover a hydropyrolysis bio-oil product (and optionally a separate, or phase-separable aqueous phase hydropyrolysis product), from which a hydropyrolysis gaseous mixture may be separated. The hydropyrolysis bio-oil product may be further treated or reacted (e.g., for further deoxygenation), or otherwise used directly as an end product, for example as a liquid fuel blending component. According to one embodiment in which an aliphatic hydrocarbon precursor or aromatic hydrocarbon precursor is co-processed in the hydroconversion reactor, the hydropyrolysis bio-oil, optionally following phase separation to remove an aqueous phase, may be combined (e.g., in the liquid phase) with this additional feedstock, and the resulting blend subsequently introduced to the hydroconversion zone.

In this manner, the condensed hydropyrolysis bio-oil (e.g., comprising the partially deoxygenated hydropyrolysis product) may be used to dilute, reduce the viscosity of, and/or dissolve solids in, the aliphatic hydrocarbon precursor or aromatic hydrocarbon precursor, prior to reaction of the resulting combined feed in the hydroconversion reactor. The condensed hydropyrolysis bio-oil may otherwise be used to render the co-feed more susceptible to volatilization, or, in general, more easily processed, in the hydroconversion reactor. According to a specific embodiment, brown grease, when used as a co-feed, may be combined with condensed hydropyrolysis bio-oil to dissolve solids in this co-feed. In another specific embodiment, solid algae, when used as a co-feed, may be combined with condensed hydropyrolysis bio-oil to produce a slurry with a high liquid content (e.g., greater than about 20% liquid by weight) that is more easily volatilized in the hydroconversion reactor. According to further embodiments, other liquids recovered from the hydropyrolysis process, for example a heavy boiling range fraction, having an initial boiling point of greater than about 400° C. (752° F.) and recovered by fractionation of the substantially fully deoxygenated hydrocarbon liquid, may also be combined with a co-feed as described herein.

Representative processes further comprise hydroconverting, preferably without intermediate condensation of a hydropyrolysis bio-oil product, at least a portion of the hydropyrolysis reactor vapor (e.g., obtained following the removal of solid char particles as described above), in a hydroconversion zone. A co-feed may alternatively be introduced to the hydroconversion zone as opposed to the hydropyrolysis reactor, depending on characteristics of the co-feed as described above. The hydroconversion zone may comprise one or more hydroconversion reactor vessels downstream of the hydropyrolysis reactor vessel. The one or more hydroconversion reactor vessels of the hydroconversion zone contain hydrogen and a hydroconversion catalyst, which is normally present as a fixed bed. The conditions of elevated hydrogen pressure, elevated temperature, and the use of hydroconversion catalyst are sufficient to further deoxygenate, and in many cases substantially fully deoxygenate, the partially deoxygenated hydropyrolysis product in the hydropyrolysis reactor vapor. The hydrogen required for this further deoxygenation, and fed to the hydroconversion zone, may be present in the hydropyrolysis reactor vapor and/or possibly an additional hydrogen-containing hydroconversion reactor feed stream, which may be fed separately or combined with the hydropyrolysis reactor vapor.

A hydroconversion zone output (i.e., the effluent from the hydroconversion reactor(s) of the hydroconversion zone) contains a gaseous mixture including $CO_2$ and at least one other non-condensable gas (e.g., $H_2$, CO, and/or $CH_4$), in addition to vapors that may be condensed. In particular, the hydroconversion zone output may be cooled prior to, or within, a separation zone (e.g., comprising one or more stages of separation, possibly at differing temperatures and/or pressures), which allows for vapor-liquid phase separation of the components of this stream, and possibly also aqueous-organic phase separation of the condensed product liquids. For example, an aqueous phase hydroconversion product may comprise water condensed from the hydroconversion zone output and an organic phase hydroconversion product may comprise a substantially fully deoxygenated hydrocarbon liquid.

From the separation zone, therefore, a substantially fully deoxygenated hydrocarbon liquid may be recovered as a condensed fraction or liquid phase, and a hydroconversion gaseous mixture may be removed as a non-condensed fraction or vapor phase. At least a portion of separated hydroconversion gaseous mixture may be introduced to a steam reformer that provides a net production of $CO_2$, in addition to a net production of hydrogen from the reforming of light hydrocarbons, for example methane, ethylene, ethane, propylene, and propane. Such light hydrocarbons may be generated from the deoxygenation of tryglycerides and free fatty acids to form paraffins, and optional cracking of these formed paraffins, and may be particularly generated by deoxygenation of the glycerol backbone of tryglycerides to form propane. Hydrogen generated from reforming may be recycled to the hydropyrolysis process to satisfy some or all of its hydrogen requirements. According to one embodiment, the steam reformer effluent (output from steam reformer), or a portion thereof, may be enriched in hydrogen (e.g., by selective removal of $CO_2$ and/or other gases) using additional separation equipment, for example a membrane separation unit or a pressure swing adsorption (PSA) unit, to provide a high purity hydrogen-containing gas stream for recycle to the hydropyrolysis reactor and/or hydroconversion reactor.

According to an embodiment, at least a second portion of separated hydroconversion gaseous mixture (e.g., a portion that is not introduced to a steam reformer as described above) may be recycled to the hydropyrolysis process, without being subjected to reforming. This second portion, as in the case of the reformer effluent or exhaust, may be enriched in hydrogen (e.g., by selective removal of $CO_2$ and/or other gases) using additional separation equipment, for example a membrane separation unit or a pressure swing adsorption (PSA) unit, to provide a high purity hydrogen-containing gas stream for recycle to the reactor and/or hydroconversion reactor.

The substantially fully deoxygenated hydrocarbon liquid may be fractionated using further separation equipment, for example a distillation column or series of distillation columns, to obtain substantially fully deoxygenated higher value liquid products such as gasoline boiling-range and/or diesel fuel boiling-range hydrocarbon fractions, as described herein.

Conditions in the hydropyrolysis reactor include a temperature generally from about 300° C. (572° F.) to about 600° C. (1112° F.), typically from about 400° C. (752° F.) to about 500° C. (932° F.), and often from about 410° C. (770° F.) to about 475° C. (887° F.). The weight hourly space velocity (WHSV) in the hydropyrolysis reactor, calculated as the combined weight flow rate of the biomass-containing feedstock and any co-feed as described herein, divided by the weight of the catalyst inventory in the hydropyrolysis reactor vessel, is generally from about 0.1 $hr^{-1}$ to about 10 $hr^{-1}$, typically from about 0.5 $hr^{-1}$ to about 5 $hr^{-1}$, and often from about 0.8 $hr^{-1}$ to about 2 $hr^{-1}$. Conditions in the hydroconversion reactor (or any of possibly two or more hydroconversion reactors, if used) include a temperature generally from about 200° C. (392° F.) to about 475° C. (887° F.), typically from about 260° C. (500° F.) to about 450° C. (842° F.), and often from about 315° C. (599° F.) to about 430° C. (806° F.). The weight hourly space velocity (WHSV) of the hydroconversion reactor, calculated as the total weight flow rate of the feed, including any co-feed as described herein, to the hydroconversion reactor (e.g., a purified vapor stream obtained from the hydropyrolysis reactor, following the removal of char particles) divided by the weight of the catalyst inventory of the hydroconversion reactor vessel, is generally from about 0.01 $hr^{-1}$ to about 5 $hr^{-1}$, typically from about 0.05 $hr^{-1}$ to about 5 $hr^{-1}$, and often from about 0.1 $hr^{-1}$ to about 4 $hr^{-1}$.

Suitable catalysts for use in the pre-reactor vessel (if used), hydropyrolysis reactor vessel, and/or at least one hydroconversion reactor vessel of a hydroconversion zone (if used) may in general have activity for hydroprocessing of the biomass-containing feedstock (including a pretreated feedstock), added co-feeds (including pretreated co-feeds), and/or their hydropyrolysis reaction products, in an environment of suitable hydrogen partial pressure, temperature, and other conditions as described herein. Hydroprocessing is meant to encompass broadly a number of possible reactions, including hydrotreating, hydrocracking, hydroisomerization, and combinations thereof, as well as possible oligomerization occurring in a hydrogen-rich environment. Representative hydroprocessing catalysts include those comprising at least one Group VIII metal, such as iron, cobalt, and nickel (e.g., cobalt and/or nickel) and at least one Group VI metal, such as molybdenum and tungsten, on a high surface area support material such as a refractory inorganic oxide (e.g., silica, alumina, titania, and/or zirconia). A carbon support may also be used.

A representative hydroconversion zone may therefore comprise two or more hydroconversion reactor vessels, for example positioned in parallel or in series, and containing catalysts having differing hydroprocessing activities and operating under different conditions (e.g., differing pressures and/or temperatures). In a particular embodiment, a first hydroconversion reactor vessel containing a catalyst having hydrotreating activity may be positioned in series with, and upstream of, a second hydroconversion reactor containing a catalyst having hydrocracking activity and/or hydroisomerization activity. Otherwise, these first and second hydroconversion reactors may be positioned in parallel. As will be appreciated by those having skill in the art, and benefitting from the knowledge gained from the present disclosure, the use of differing hydroprocessing catalysts in one or more hydroconversion reactor vessels, arranged in various configurations, may be tailored to achieve desired characteristics of the substantially fully deoxygenated hydrocarbon liquid, based on the properties of the particular biomass-containing feedstock being processed. For example, hydrocracking may be useful for reducing the molecular weight of paraffinic hydrocarbons derived from an aliphatic hydrocarbon precursor, if an increased yield of gasoline boiling range hydrocarbons is a desired objective. Hydroisomerization may be useful for increasing the degree of branching of paraffinic hydrocarbons derived from an aliphatic hydrocarbon precursor, if improved cold flow properties of diesel boiling range hydrocarbons is a desired objective.

Following a period of extended use, catalyst or other solid bed material (sorbent and/or heat transfer medium) may accumulate coke, carbon, or other materials (e.g., melted plastic) that is detrimental to the functioning of the catalyst or solid bed material for its intended purpose. Catalyst or other solid bed material having accumulated deposits may be withdrawn from any of the pre-reactor vessel, hydropyrolysis reactor vessel, and/or hydroconversion reactor vessel(s), for example incidentally as entrained particles in the vapor streams exiting these reactor vessels, or otherwise deliberately from the solid beds within these reactor vessels (e.g., fluidized particle beds within the pre-reactor vessel and/or hydropyrolysis reactor vessel, or fixed particle beds within the hydroconversion reactor vessel(s)). In the case of withdrawing the catalyst and/or other solid bed material from within particle beds, this may be carried out using a solids drawoff outlet exiting the particle bed. Any withdrawn catalyst or other solid bed material may be separated from unwanted solids (e.g., char particles) in a fraction enriched in the catalyst or other solid bed material, for example by using a separation based on density, and returned to their respective reactor vessels.

Prior to this return of any withdrawn catalyst or other solid bed material, or any fraction enriched in these solids, however, such withdrawn catalyst, withdrawn other solid bed material, or enriched fraction(s) thereof, may be subjected to conditions under which accumulated coke, carbon, or other accumulated materials, including adsorbed catalyst poisons, are removed. Representative conditions include oxidizing conditions sufficient to regenerate the catalyst or other solid bed material, by removing the accumulated coke and carbon by combustion, as well as reducing conditions (e.g., in the presence of a flowing hydrogen-containing gas) sufficient to hydrogasify the accumulated coke and carbon, converting these contaminants to methane and other light hydrocarbons. Hydrogasification of withdrawn catalyst, in a hydrogasification vessel, may be accompanied by sulfiding of this catalyst, for example by introducing $H_2S$ or a suitable $H_2S$ precursor into the hydrogen-containing gas.

Regeneration conditions sufficient to combust accumulated coke and other accumulated deposits are known in the art and include a regeneration temperature generally in the range from about 400° C. (752° F.) to about 750° C. (1382° F.) in an oxygen-containing environment. Hydrogasification conditions sufficient to form methane and other hydrocarbons from accumulated coke and other accumulated deposits are known in the art and include a hydrogasification temperature generally in the range from about 500° C. (932° F.) to about 950° C. (1742° F.). Both regeneration and hydrogasification may be performed at substantially atmospheric pressure or slightly above atmospheric pressure (e.g., less than about 3 bar above atmospheric pressure).

Due to the diverse functions of the pre-reactor (if used), operating conditions in the pre-reactor may vary broadly and may include the ranges of temperatures and pressures described above with respect to the hydropyrolysis reactor. However, higher and lower temperatures are contemplated for some embodiments, for example representative temperatures may range generally from about 150° C. (302° F.) to about 650° C. (1202° F.), and typically from about 260° C. (149° F.) to about 540° C. (1004° F.), depending on the specific objective(s) of the pretreating step. Also, due to the significant extent of deoxygenation in the hydropyrolysis reactor vessel and optional hydroconversion reactor vessel, the associated hydropyrolyzing and hydroconverting steps are normally both exothermic, i.e., the reactions associated with these steps involve a net generation of heat, despite the pyrolysis reactions in isolation being endothermic. In contrast, due to the relatively low extent of hydroconversion (or in some cases no hydroconversion), occurring in the pre-reactor vessel, the pre-reactor operation is generally endothermic, i.e., the reactions in the pre-reactor overall involve a net consumption of heat.

Further representative operating conditions for hydropyrolysis and hydroconversion and their significance are described in greater detail below. Some representative conditions are also described in U.S. patent application publication nos. US 2010/0251600, US 2010/0256428, US 2010/0251615, and US 2013/0338412, in addition to U.S. patent application Ser. No. 14/321,147, the contents each of these documents being hereby incorporated by reference in its entirety.

As described in these publications, catalysts and operating conditions in both the hydropyrolysis and hydroconversion reactor vessels may be adjusted such that the deoxygenation reactions, which remove oxygen from biomass-derived molecules (e.g., cellulose, hemicellulose, and/or lignin), are balanced between hydrodeoxygenation, which yields $H_2O$, and the non-condensable gas-yielding reactions of decarbonylation and decarboxylation, which yield CO and $CO_2$, respectively. Advantageously, the production of a significant amount of these gases from biomass oxygen (or the total oxygen in the biomass-containing feedstock and added co-feed(s)) in turn allows for their subsequent use, in re-reforming of gaseous mixtures (e.g., from the hydropyrolysis reactor output and/or the hydroconversion reactor output) in which they are contained (e.g., together with light hydrocarbons), to generate some or all of the hydrogen required in the integrated process. In the case of the use of a pre-reactor as described herein, the hydrogen required for the integrated process may include the amount of hydrogen consumed in the pre-reactor, for example if a hydrogen-containing gas is used as a pre-reactor fluidizing gas, for carrying out devolatilization and/or hydropyrolysis.

According to representative embodiments, at least about 20% of the oxygen content of the biomass-containing feedstock and added co-feed(s) (including pretreated co-feed(s)), or at least about 20% of the oxygen content of the pretreated feedstock and added co-feeds (including pretreated co-feeds), as described herein, is converted to CO and $CO_2$ following hydropyrolysis and hydroconversion, and optionally also following pretreating, including devolatilization. Representative ranges of conversion of the oxygen content of the biomass-containing feedstock and co-feeds or pretreated feedstock and co-feeds (including pretreated co-feeds) to CO and $CO_2$ following these steps are from about 20% to about 80%, from about 30% to about 70%, and from about 40% to about 60%, in order to achieve a proper balancing between hydrodeoxygenation and decarbonylation/decarboxylation, as described above. Representative ranges of conversion of this oxygen content to $H_2O$ following these steps are at most about 80%, from about 20% to about 80%, from about 30% to about 70%, and from about 40% to about 60%. These ranges of feedstock or pretreated feedstock oxygen content being converted following hydropyrolysis and hydroconversion are not necessarily representative of the final disposition of biomass oxygen content following downstream conversion by steam reforming, in which the $H_2O$ formed in hydropyrolysis and/or hydroconversion may be consumed. According to some embodiments, the final disposition of feedstock or pretreated feedstock oxygen content to CO and $CO_2$, following steam reforming, may be significantly higher. For example, according to some embodiments in which the process is integrated with steam reforming, at least about 90%, and in some cases at least about 95%, of the feedstock or pretreated feedstock oxygen content may be used to form CO and/or $CO_2$. It should also be noted, however, that, according to other embodiments, methanation of CO and/or $CO_2$ to form methane may serve to reduce these amounts.

In yet other embodiments, for example in the case of using a triglyceride-containing component as a co-feed, a significant amount of light hydrocarbons (e.g., propane) may be generated from deoxygenation in the hydropyrolysis reactor and/or hydroconversion zone. As a result, it may be possible to operate under conditions (e.g., higher hydrogen pressures) at which a greater percentage of biomass oxygen is converted to $H_2O$, while still producing sufficient hydrogen, through the reforming of these light hydrocarbons, for the requirements of the hydropyrolysis process (i.e., without the need to import hydrogen). Therefore, according to particular, representative embodiments in which such light hydrocarbon-forming co-feeds are introduced, less than about 20% (e.g., in the range from about 1% to about 20%, or from about 5% to about 20%) of the total oxygen content of the biomass-containing feedstock (including pretreated feedstock) and added co-feeds (including pretreated co-feeds) is converted to CO and $CO_2$ following hydropyrolysis and hydroconversion, and optionally also following pretreating, including devolatilization. Advantageously, depending on the particular composition of the co-feed and hydrocarbon compounds generated therefrom, operation under such conditions may still achieve a hydrogen-balanced condition.

According to some embodiments, the desired balancing of biomass oxygen conversion to liquid and gaseous products may also be achieved using moderate reaction conditions, such as moderate levels of pressure and/or hydrogen partial pressure in the hydropyrolysis and/or hydroconversion reactors, as moderate levels of pressure and/or hydrogen partial pressure have been found to result in relatively greater yields of CO and $CO_2$, at the expense of $H_2O$, compared to the use of higher levels of pressure and/or hydrogen partial pressure in conventional hydroprocessing operations (e.g., conventional hydrotreating and/or hydrocracking of petroleum fractions). Representative pressures and/or hydrogen partial pressures in the hydropyrolysis and hydroconversion reactors (expressed as gauge pressures) may be independently less than about 55 barg (798 psig) (e.g., from about 7 barg (102 psig) to about 55 barg (798 psig), from about 14 barg (203 psig) to about 41 barg (595 psig), or from about 21 barg (305 psig) to about 38 barg (551 psig)).

According to some embodiments, it may be desirable for the hydropyrolysis reactor pressure to be substantially the same as that of the hydroconversion reactor, for example in the case in which the hydropyrolysis reactor vessel is operated at a pressure only slightly above that of the hydroconversion reactor vessel (e.g., at most about 3.5 bar (51 psi) above, or at most about 2 bar (29 psi) above), as needed to at least overcome the pressure differential between these vessels during normal operation. Likewise, the pre-reactor vessel, if used, may be operated at a pressure only slightly above that of the hydropyrolysis reactor vessel (e.g., at most about 3.5 bar (51 psi) above, or at most about 2 bar (29 psi) above). In this manner, costs associated with the compression of gas streams, (e.g., recycled hydrogen-containing streams) may be reduced. According to representative processes in which the pressure differential between reactors is minimized, the pre-reactor vessel may be disposed directly below the hydropyrolysis reactor vessel, or otherwise may form part of the hydropyrolysis reactor vessel (i.e., the solid bed material of the pre-reactor may be disposed in the same physical vessel as the hydropyrolysis reactor), in which case the operating pressures of the pre-reactor and hydropyrolysis reactor may be substantially the same.

Exemplary Embodiments

In accordance with aspects of the disclosure, a hydropyrolysis process comprises feeding (i) hydrogen, a (ii) a biomass-containing feedstock (including a pretreated feedstock, for example following devolatilization and/or hydropyrolysis), and/or (iii) a co-feed (including a pretreated co-feed, for example following devolatilization), to a hydropyrolysis reactor vessel. The process comprises combining, co-processing, or blending different feedstocks to produce liquid hydrocarbon products that have significant and desirable properties, proportions, and/or yields, which are described more fully below.

When a biomass feedstock, e.g., wood, is subjected to hydropyrolysis and hydrodeoxygenation, the biomass feedstock may be converted into hydrocarbon products, e.g., gasoline or diesel fuel. It is has been found, however, that the hydrocarbon products may not meet or be consistent with the product properties associated with a commercially-viable fuel.

In an aspect, the present disclosure provides a process to increase and improve the cetane number of diesel boiling point range hydrocarbon products. In an aspect, the process may comprise adding an organic liquid (as a co-feed) to the second stage of the process, i.e., the hydrodeoxygenation stage or hydro conversion unit, wherein the organic liquid is susceptible to conversion to a paraffin when placed in the second stage of the process. The organic liquid may be an animal fat or a plant oil that includes triglycerides and/or free fatty acids. Examples include. brown grease, vegetable oils, and tall oils. The organic liquid may be a waste product of another process that would otherwise have to be treated and/or disposed of at a cost and burden on the environment. The process may comprise deoxygenating and converting the organic liquid in the second stage of the process to paraffins. The process may comprise converting the paraffins into diesel boiling point range liquids. In an aspect, the process may comprise pumping or spraying the organic liquid (as a co-feed) into the second stage of the process where it is rapidly heated (e.g., to a predetermined temperature). In an embodiment, to avoid a heat penalty, waste heat and low-grade process heat may be used to warm the organic liquid before adding the organic liquid to the second stage of the process.

In an aspect, to increase and improve the cetane number of diesel boiling point range hydrocarbon liquid products, the organic liquid may be added to the first stage of the process, i.e., a hydropyrolysis unit. In an embodiment, the organic liquid may be added as a slurry to the first stage of the process. In an embodiment, the organic liquid may comprise brown grease having a significant amount of solids present.

In an aspect of the disclosure, the organic liquid may be employed as a first-stage quench and reduce the temperature of process vapors directed to the hydroconversion unit. This could reduce or eliminate the need for a heat exchanger to cool the hot process vapors exiting the char removal system located between the hydropyrolysis unit and the hydroconversion unit.

By adding the organic liquid according to the aspects above, the process may produce very high-quality diesel, and help offset the high aromatic content of certain cellulosic feeds.

In an aspect, the present disclosure provides a process to improve the production of high quality diesel fuel by introducing a solid feedstock to the process, wherein the solid feedstock is selected from the group consisting of solid, dried, granulated algae, including solid, dried, and granulated high-lipid algae and/or solid, dried, and granulated de-lipidized algae, and combinations thereof. It has been found that by adding this solid feedstock to the process results in production of a higher grade of diesel product, with a higher cetane number, than the diesel product obtained when wood is the sole feedstock converted in the process. This may be due to the presence of molecules such as lipids and triglycerides in the cellular structure of the algae, which, when vaporized and deoxygenated, form paraffinic hydrocarbons with molecular weights that place them in the boiling point range of kerosene, diesel, and jet fuel. Significantly, these solid feedstocks may be introduced into the fluidized bed of the first stage or hydropyrolysis reactor of the process, not into the fixed bed of the second stage or hydroconversion reactor of the process. A fixed bed reactor is capable of processing feedstocks that are gases and/or liquids, but is not capable of processing a solid feedstock. The process is unique in that it may treat combinations of feedstocks, such as solid wood particles, and feedstocks such as solid, granular algae particles, in various proportions, allowing liquid hydrocarbon product properties to be adjusted on the basis of the proportion of each feedstock in the stream or streams entering the first-stage reactor.

In an aspect, the present disclosure provides a process comprising introducing of certain feedstocks in an amount and manner to obtain a desired proportional yield of the various hydrocarbon products, and to improve diesel product quality, or gasoline product quality, or the quality of any other cut of the hydrocarbon product. For example, when wood alone is converted in an integrated hydropyrolysis and hydroconversion process, the combined total hydrocarbon product may contain approximately 70% by mass gasoline, and 30% by mass diesel. When vegetable oil is injected into the process, and converted along with wood, approximately 100% by mass of the product from vegetable oil may be diesel-range hydrocarbons. Therefore, if an integrated hydropyrolysis and hydroconversion process is converting two feedstock streams (with the total consisting of 50% by mass wood, and 50% by mass vegetable oil), then the combined total hydrocarbon product may contain about 35% by mass gasoline, and about 65% by mass diesel, which may be a desired proportional yield. Thus, in an embodiment, the mass gasoline percentage of the total substantially fully deoxygenated hydrocarbon liquid may equal about (0.7) times (mass percentage of the first biomass-containing feedstock) and the mass diesel percentage of the total substantially fully deoxygenated hydrocarbon liquid may equal about 1−(0.7) times (mass percentage of the first biomass-containing feedstock.

In an aspect of the present disclosure, the process may comprise conveying a primary feedstock to a first stage or hydropyrolysis reactor, and conveying a secondary feedstock to the first stage reactor, wherein the secondary feedstock is different from the primary feedstock. The primary feedstock may comprise a biomass feedstock. The secondary feedstock may comprise the organic liquid discussed above. In an aspect, the secondary feedstock may be injected, sprayed, or pumped into the first stage reactor of the process. In this way, a unique and desirable level of control over the temperature profile of the first stage reactor may be achieved. For example, a primary feedstock, e.g., wood, may be introduced near the bottom of the first stage reactor, proximate to the distribution plate through which fluidizing hydrogen gas enters the bed of the reactor. Initially, each wood particle absorbs heat from the bed, and reduces the local temperature near the solid feedstock inlet, where the wood enters the bed. However, vapors generated during devolatilization of the wood then rise through the bed, and undergo exothermic deoxygenation. This release of heat may increase temperatures in the upper sections of the fluidized bed, beyond the range of temperatures which are known to be optimal. To reduce or eliminate this effect, the process may comprise injecting the secondary feedstock (e.g., vegetable oils, liquid fats, and liquid greases) into the first stage reactor. The secondary feedstock serves to lower the bed temperature near the point where the secondary feedstock is injected, particularly if the secondary feedstock consumes a significant amount of heat energy as it is vaporized, and releases only a limited (smaller) amount of energy as it is deoxygenated. Vegetable oils, liquid fats, and liquid greases, comprise proportionately less chemically-bonded oxygen, by mass, than wood, and could thus have the effect described above. The secondary feedstock may also be injected into the process vapor stream leaving the first stage, in which case the secondary feedstock may reduce the temperature of the process vapor stream, and may help control the temperature profile in the second stage reactor. Secondary feedstocks may also be introduced into a variety of locations in the second stage reactor, in order to adjust and control the temperature profile therein.

In an aspect of the present disclosure, in addition to fats, oils, and greases, which tend to increase diesel yield and diesel cetane number, it has now been discovered that it is possible to convert other organic liquids, which tend to increase the proportion of gasoline and aromatics content of the hydrocarbon product. For example, conventional pyrolysis oil, and pyrolysis oil generated via catalytic pyrolysis (in the absence of a high-pressure hydrogen atmosphere) may increase the yield of aromatics and naphthenes in the combined total hydrocarbon product. Black liquor, which is generated by the Kraft papermaking process, consists of an aqueous solution of lignin and hemicelluloses, as well as a wide variety of other contaminants and inorganic compounds. It has been found that black liquor, when converted via an integrated hydropyrolysis and hydroconversion process, increases the proportional yield of gasoline-range hydrocarbons and the aromatics and naphthenics content of the various cuts of the total hydrocarbon product. Aromatics content is an important parameter of any hydrocarbon fuel. In gasoline, aromatics content may have a significant effect on octane number, and in diesel, kerosene, and jet fractions aromatics content has an important effect on cloud point and viscosity. While aromatics content, and the content of related molecules, should be kept within certain ranges, and below certain maximum values, in order to meet fuel specifications, it has now been found that co-processing of a liquid feedstock such as pyrolysis oil, with another liquid feedstock such as vegetable oil, may allow for adjusting of properties of the total hydrocarbon product, and optimizing the product by adjusting the proportions of the different liquid feedstocks that are converted. While an integrated hydropyrolysis and hydroconversion process may be capable of converting a solid feedstock, it is also possible to operate the process in such a manner that one or more liquid feedstocks are converted. The properties of the liquid hydrocarbon product may then be controlled by increasing the proportion of one feedstock versus the other(s) feedstock.

In an aspect of the present disclosure, a process is provided that comprises adding a hydrophilic or aqueous liquid, e.g., pyrolysis oil, black liquor, and slurries to the first stage of an integrated hydropyrolysis and hydroconversion process. The fluidized bed of the hydropyrolysis reactor provides a surprising advantage in that it may accept and suitably treat liquids that are prone to rapid coking under hydroprocessing conditions. While rapid coke formation is often unavoidable, it has been discovered that, due to the nature of the bubbling fluidized bed of the disclosed process, solid coke is reduced or prevented from forming large solid structures. Instead, to the extent coke does form in the first stage reactor of the process, the coke forms on the outer surface of particles of the bed material, is attritted or abraded, and is then removed from the bed via elutriation. The coke is then removed via the char/solids recovery train downstream of the first stage reactor. Thus, even aqueous slurries of, for example, high-lipid algae, may be processed directly and continuously in the first stage of the process. The water associated with the slurry evaporates once the slurry enters the bed, the algal material is heated and devolatilized, and the vapors released during devolatilization are hydrotreated. Any coke or char, formed during devolatilization of the algal material, is then attritted and elutriated.

In an aspect of the present disclosure, it has now been discovered that the first stage of an integrated hydropyrolysis and hydroconversion process provides a unique and surprising advantage with regard to processing of contaminated or low-value feedstock streams (such as black liquor), which may contain catalyst poisons. If the feedstock stream under consideration is a liquid containing catalyst poisons, which rapidly degrade or reduce the activity of catalyst needed to carry out deoxygenation and hydrotreating reactions, then the feedstock stream may not be processed easily in a fixed-bed reactor. Even in the absence of coking, the bed of such a reactor would require frequent removal and replacement, making steady, stable, continuous operation of the process difficult, if not impossible. Catalyst in the fluidized bed of the first stage of the integrated hydropyrolysis and hydroconversion process is constantly replaced. Specifically, relatively small amounts of fresh catalyst may be added continuously or at intervals, and spent catalyst is removed, via attrition and/or elutriation, from the top of the fluidized bed. Spent catalyst may be recovered from the process via the same solids recovery train that removes char/coke from the process vapors leaving the first-stage reactor. For this reason, the integrated hydropyrolysis and hydroconversion process enables co-processing of a wide range of feedstocks, solid or liquid, which makes it possible to adjust, control, and optimize the properties of the liquid hydrocarbon product stream.

In an aspect of the present disclosure, a liquid feedstock may be conveyed via deposition on a solid feedstock and treated in a first stage of an integrated hydropyrolysis and hydroconversion process. For example, liquid feedstock such as pyrolysis oil, an aqueous slurry or black liquor, which contains a high level of water, may be sprayed onto wood chips. The water may then be driven off, e.g., dried, leaving the most valuable fractions of the liquid feedstock as a solid or semi-solid deposit on and within the wood chips. These valuable fractions may then be conveyed into the first stage reactor. In addition, any coke generated during devolatilization of the feedstock may tend to be incorporated into the structure of the solid char of the wood chips, and catalyst poisons or corrosive species (such as chlorine) may also be effectively bound to that char. When the char is elutriated from the bed, and recovered from the process, the coke, catalyst poisons, and corrosive species may also tend to be removed.

In an aspect of the present disclosure, a liquid feedstock, including but not limited to vegetable oil, may be co-processed with a solid feedstock, including but not limited to wood chips in the first-stage of an integrated hydropyrolysis and hydroconversion process. Hydrophobic feedstocks, such as vegetable oils, may not be significantly improved via drying. In this case, it is still possible to co-process the liquid feedstock with the solid feedstock, without significantly modifying the first-stage reactor, the second-stage reactor, or any other part of the process equipment. It has now been discovered that lignocellulosic feedstocks may adsorb large quantities of these liquids (i.e. fats, vegetable oils, etc.). It has been found that wood chips (e.g., sawdust) may adsorb enough hydrophobic liquid to produce a combined feedstock that is over 50% by mass liquid. Surprisingly, the mechanical properties of the resulting combination (sawdust plus oil) are still quite similar to those of the dry wood chips. No modifications to the solids-handling equipment need be made in order to introduce the treated feedstock into the first-stage reactor, and the liquid feedstock then participates in the process as it would if it were injected directly into the first-stage reactor.

In an aspect of the present disclosure, it has now been discovered that particularly problematic liquid feedstocks, such as black liquor, may be devolatilized in a pre-reactor upstream of the first-stage reactor of an integrated hydropyrolysis and hydroconversion process. Such a pre-reactor may comprise a fluidized bed of some solid material, a mechanically-agitated bed, a heated, pressurized ball mill, etc. The function of the pre-reactor may be to convert the liquid feedstock into a stream of process vapor, which may then be further processed in the first-stage reactor. Solid feedstocks, such as wood chips or materials derived from municipal solid waste, may also be co-processed along with liquid feedstocks in the pre-reactor. The properties of any solid bed material in the pre-reactor may also trap catalyst poisons and corrosive species, significantly improving the properties and characteristics of the stream of process vapor entering the first stage reactor.

In an aspect of the present disclosure, it has now been discovered that the unique and surprising features of an integrated hydropyrolysis and hydroconversion process provides for a wide range applications, allowing multiple solid or liquid feedstocks to be converted in either the first or second-stage reactors, as desired. In each case, the properties, and proportions, of the feedstock streams, may be adjusted in order to optimize the properties of each of the desired liquid hydrocarbon product streams.

FIG. 1 depicts one possible process for carrying out the steps of hydropyrolyzing biomass 112 in a first stage or hydropyrolysis reactor 114 using hydrogen-containing stream 116. Hydrogen-containing stream 116 may be combined with reformer effluent or exhaust stream 128 and introduced at the bottom of hydropyrolysis reactor 114, as shown in FIG. 1. Hydrogen-containing stream 116 may alternatively be introduced at multiple axial heights of hydropyrolysis reactor 114 (corresponding to those within and/or outside of, a deoxygenating catalyst bed 118) for the purpose of controlling temperature and/or localized gas velocities, or otherwise improving the uniformity of consumption hydrogen.

Hydropyrolysis reactor 114 may therefore comprise a deoxygenating catalyst bed 118, above which is an expanded diameter gas-catalyst disengagement zone 120. Gas-catalyst disengagement zone 120 may generally extend to a height above the transport disengagement height (TDH) for catalyst bed 118 under the operating conditions employed in hydropyrolysis reactor 114. Gas-catalyst disengagement zone 120 may provide a zone of reduced superficial gas velocity, promoting the effective disengagement of relatively small diameter catalyst particles that would otherwise be elutriated at the higher superficial gas velocity through bed 118. Optionally, gas-catalyst separation may be further improved using mechanical separation devices such as cyclones (not shown) within gas-catalyst disengagement zone 120.

In addition, one or more deoxygenating catalyst inlets 122 and one or more deoxygenating catalyst drawoff outlets 124 may provide for continuous or intermittent introduction and/or removal of deoxygenating catalyst to and/or from hydropyrolysis reactor 114. For example, fresh deoxygenating catalyst may be continuously or intermittently introduced through deoxygenating catalyst inlet(s) 122 and spent or partially spent deoxygenating catalyst may be continuously or intermittently removed through deoxygenating catalyst drawoff outlet(s) 124.

According to the embodiment shown in FIG. 1, substantially all char particles in hydropyrolysis reactor output 130 are removed in hydropyrolysis reactor gas-solids separator 132. Entrained char particles may be removed using mechanical devices including filters, external cyclones, electrostatic separators, liquid contactors (e.g., bubblers), etc. to provide purified hydropyrolysis vapor stream 134 having a reduced char content and optionally a char-enriched stream 136, for example in the case of external cyclones, electrostatic separators, barrier filters, and other mechanical devices that provide an effluent stream of relatively concentrated char particles. In an embodiment, heat exchanger 138 may be used to heat purified hydropyrolysis vapor stream 134 prior to being introduced in hydroconversion reactor 150.

In an embodiment, an organic liquid 142 may be introduced into second stage or hydroconversion reactor 150. Organic liquid 142 may be an animal fat or a plant oil that includes triglycerides and/or free fatty acids. Examples include brown grease, vegetable oils, and tall oils. Organic liquid 142 may be a waste product of another process that would otherwise have to be treated and/or disposed of at a cost and burden on the environment. The process may comprise deoxygenating and converting organic liquid 142 in the second stage of the process to paraffins. The process may comprise converting the paraffins into diesel boiling point range liquids. In an aspect, the process may comprise pumping or spraying organic liquid 142 into hydroconversion reactor 150 where organic liquid 142 is rapidly heated up to a predetermined temperature. In an embodiment, to avoid a heat penalty, waste heat and low-grade process heat may be used to warm organic liquid 142 before adding organic liquid 142 to hydroconversion reactor 150.

As shown in FIG. 1, organic liquid 142 may be added to purified hydropyrolysis vapor stream 134 to quench purified hydropyrolysis vapor stream 134, thereby reducing the temperature of purified hydropyrolysis vapor stream 134 directed to hydroconversion reactor 150. Organic liquid 142 may quench purified hydropyrolysis vapor stream 134 to an extent that the need for heat exchanger 138 may be reduced or eliminated.

In an aspect, to increase and improve the cetane number of diesel boiling point range hydrocarbon liquid products, organic liquid 152 may be added to the first stage of the process, i.e., hydropyrolysis reactor 114. In an embodiment, organic liquid 152 may be the same as or similar to organic liquid 142. Thus, organic liquid 152 may be an animal fat or a plant oil that includes triglycerides and/or free fatty acids. Examples include brown grease, vegetable oils, and tall oils. Organic liquid 152 may be a waste product of another process that would otherwise have to be treated and/or disposed of at a cost and burden on the environment. Organic liquid 152 may be added as a slurry to the first stage of the process. In an embodiment, organic liquid 152 may comprise brown grease having a significant amount of solids present. By adding organic liquid 152 according to the aspects above, the process may produce very high-quality fuel products 162, e.g., including high-quality diesel fuel, and help offset the high aromatic content of certain cellulosic biomass feeds introduced to hydropyrolysis reactor 114.

In an embodiment, organic liquid 142 may be added to hydroconversion reactor 150 as described above, and organic liquid 152 may be added to hydropyrolysis reactor 114 as described above. In an embodiment, organic liquid 142 may be added to hydroconversion reactor 150 as described above, and organic liquid 152 is not added to hydropyrolysis reactor 114 as described above. In an embodiment, organic liquid 152 may be added to hydropyrolysis reactor 114 as described above, and organic liquid 142 is not added to hydroconversion reactor 150 as described above.

As shown in FIG. 1, hydroconversion product stream 154 from hydroconversion reactor 150 may be cooled in heat exchanger 156, and gases and condensed liquids in hydroconversion product stream 154 may then be separated in separator 158. Gases 144 from separator 158 may be conveyed to reformer 160. Reformer 160 may be a steam reformer. Reformer effluent or exhaust stream 128 may be conveyed from reformer 160 to hydropyrolysis reactor 114. Reformer effluent (output from steam reformer), or a portion thereof, may be enriched in hydrogen (e.g., by selective removal of $CO_2$ and/or other gases) using additional separation equipment, for example a membrane separation unit or a pressure swing adsorption (PSA) unit, to provide a high purity hydrogen-containing gas stream for recycle to the hydropyrolysis process. This, in turn, allows for the recovery of a $CO_2$-enriched product of separation from the steam reformer effluent. Liquid effluent 162 from separator 158 may comprise high-quality diesel containing products.

In an aspect of the present disclosure, the process may comprise conveying a primary feedstock to a first stage or hydropyrolysis reactor, and conveying a secondary feedstock to the first stage reactor, wherein the secondary feedstock is different from the primary feedstock. The primary feedstock may comprise a biomass feedstock, for example, biomass 112. The secondary feedstock may comprise the organic liquid discussed above, for example, organic liquid 152. In an aspect, the secondary feedstock may be injected, sprayed, or pumped into the first stage reactor of the process. In this way, a unique and desirable level of control over the temperature profile of the first stage reactor 114 may be achieved. For example, a primary feedstock, such as biomass 112 (e.g., wood) may be introduced near the bottom of the first stage reactor 114, proximate to the distribution plate through which fluidizing hydrogen gas (which may be a combination of hydrogen-containing stream and reformer effluent or exhaust stream 128) enters bed 118 of reactor 114. Initially, each wood particle absorbs heat from the bed, and reduces the local temperature near the solid feedstock inlet, where the wood enters bed 118. However, vapors generated during devolatilization of the wood then rise through bed 118, and undergo exothermic deoxygenation. This release of heat may increase temperatures in the upper sections of the fluidized bed 118, beyond the range of temperatures which are known to be optimal. To reduce or eliminate this effect, the process may comprise injecting the secondary feedstock or organic liquid 152 (e.g., vegetable oils, liquid fats, and liquid greases) into the first stage reactor. The secondary feedstock serves to lower the bed temperature near the point where the secondary feedstock is injected, particularly if the secondary feedstock consumes a significant amount of heat energy as it is vaporized, and releases only a limited (smaller) amount of energy as it is deoxygenated. Vegetable oils, liquid fats, and liquid greases, comprise proportionately less chemically-bonded oxygen, by mass, than wood, and could thus have the effect described above. The secondary feedstock may also be injected into the process vapor stream leaving the first stage, in which case the secondary feedstock may reduce the temperature of the process vapor stream, and may help control the temperature profile in the second stage reactor. Secondary feedstocks may also be introduced into a variety of locations in the second stage reactor, in order to adjust and control the temperature profile therein.

Figure 2:
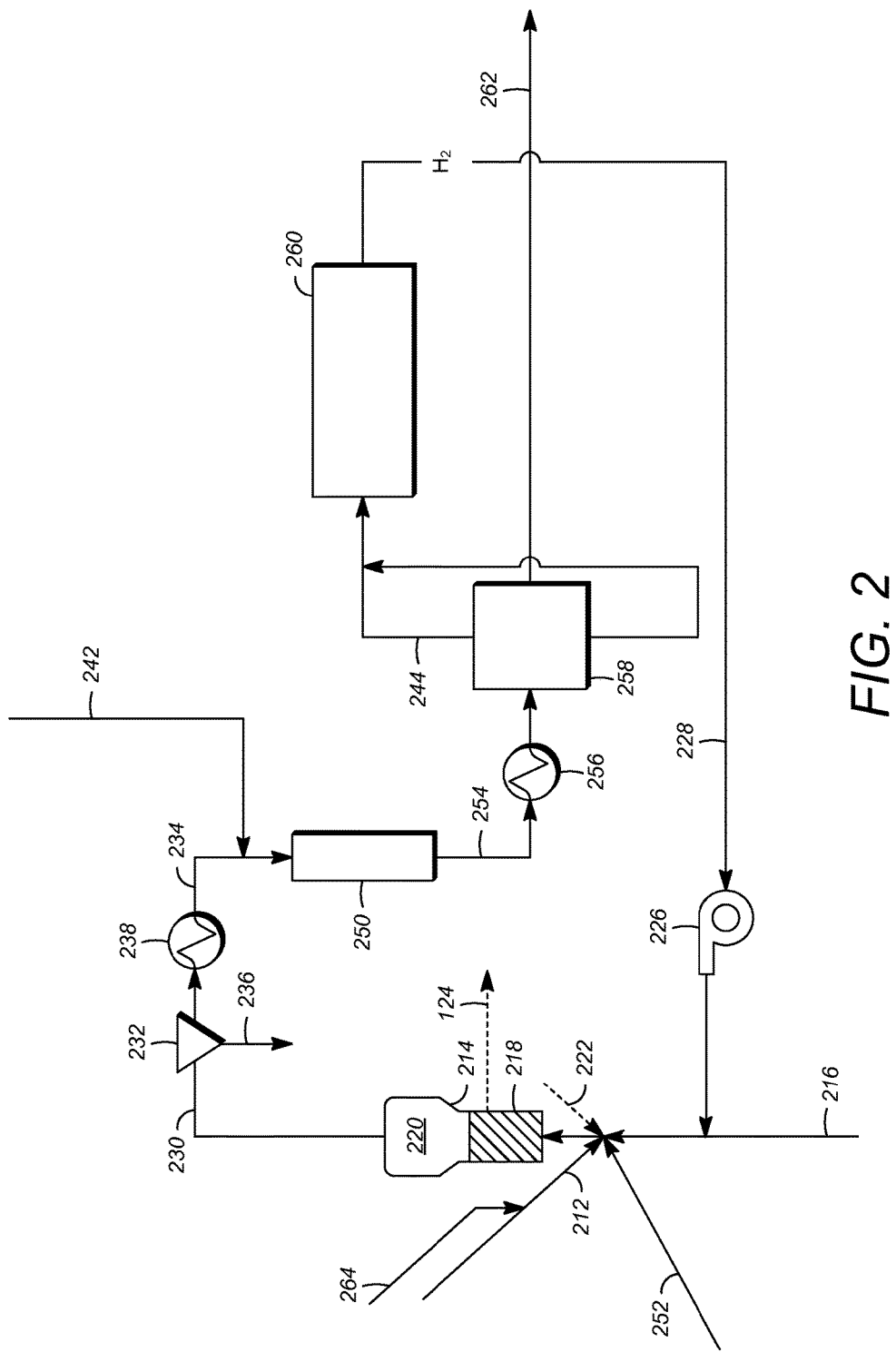
FIG. 2 is a schematic flow diagram of a hydropyrolysis process for producing liquid fuels from co-processing biomass, according to another embodiment of this disclosure.

FIG. 2 is a schematic flow diagram of another embodiment in accordance with the disclosure. As shown in FIG. 2, solid feedstock 264 may be introduced into hydropyrolysis reactor 214 having bed 218. Solid feedstock 264 may be selected from the group consisting of solid, dried, granulated algae, including solid, dried, granulated high-lipid algae. As shown in FIG. 2, solid feedstock 264 may be combined with biomass 212, prior to introduction into hydropyrolysis reactor 214. Alternatively, solid feedstock 264 may be added to hydrogen-containing gas 216, and/or to inlets for introducing deoxygenating catalyst and/or to organic liquid 252, before being introduced into hydropyrolysis reactor 214.

It has been found that by adding solid feedstock 264 to the process results in production of a higher grade of diesel product, with a higher cetane number, than the diesel product obtained when wood is the sole feedstock (e.g., biomass 212) converted in the process. Thus, liquid effluent 262 from separator 258 may comprise high-quality diesel containing products. Liquid effluent 262 may be similar to liquid effluent 162 shown in FIG. 1. The higher grade of diesel product, with a higher cetane number, may be due to the presence of molecules such as lipids and triglycerides in the cellular structure of the algae in feedstock 264. These molecules, when vaporized and deoxygenated, form paraffinic hydrocarbons with molecular weights that place them in the boiling point range of kerosene, diesel, and jet fuel. Significantly, solid feedstock 264 may be introduced into the fluidized bed of the first stage or hydropyrolysis reactor of the process, not into the fixed bed of the second stage or hydroconversion reactor of the process. A fixed bed reactor is capable of processing feedstocks that are gases and/or liquids, but is not capable of processing a solid feedstock. The process is unique in that it may treat combinations of feedstocks, such as solid wood particles, and feedstocks such as solid, granular algae particles, in various proportions, allowing liquid hydrocarbon product properties to be adjusted on the basis of the proportion of each feedstock in the stream or streams entering the first-stage hydropyrolysis reactor 214.

In an embodiment, solid feedstock 264 may be added to hydropyrolysis reactor 214 as described above with or without any combination of addition of organic liquid 242 to hydroconversion reactor 150 as described above, and/or combination of addition of organic liquid 252 to hydropyrolysis reactor 214 as described above.

Figure 3:
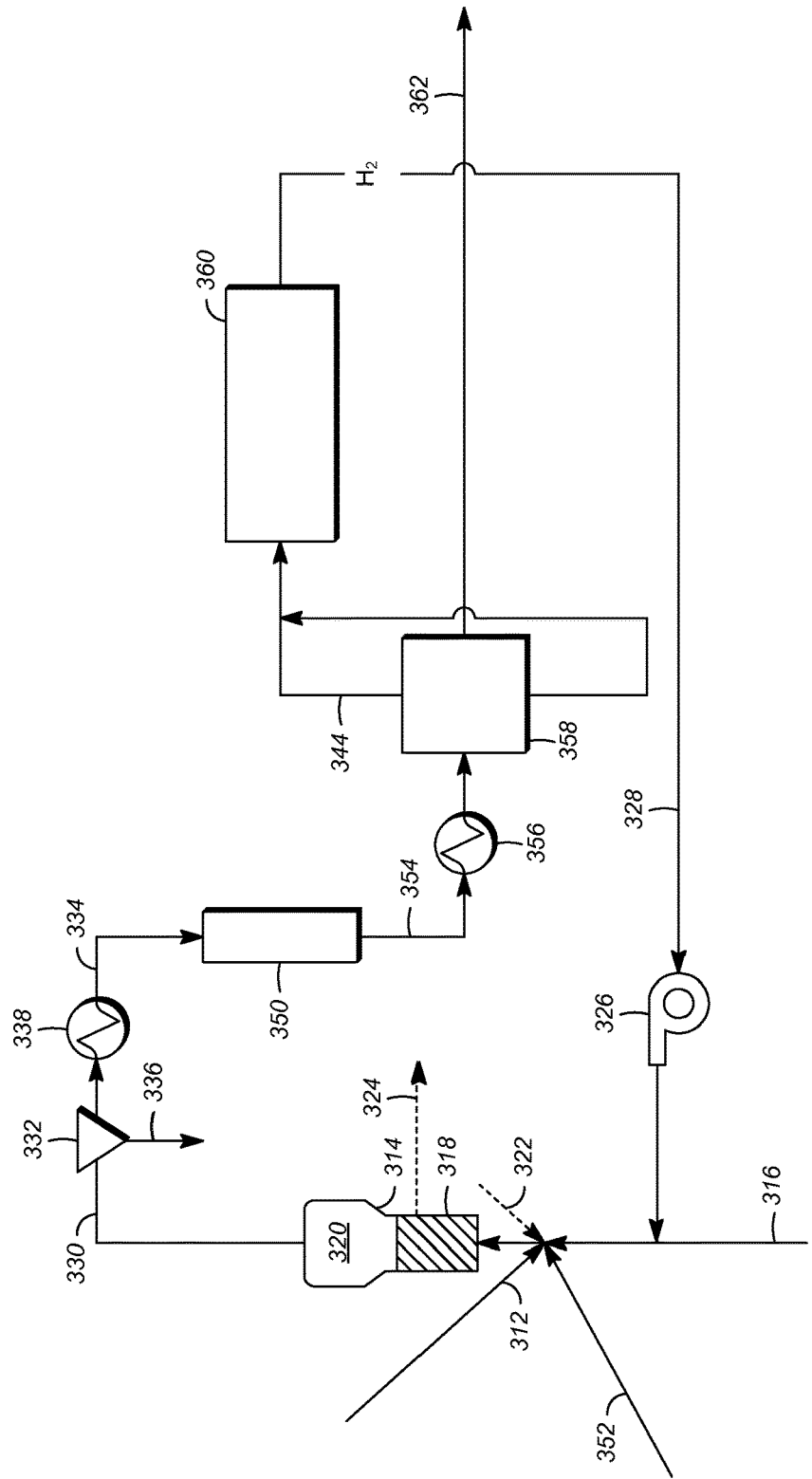
FIG. 3 is a schematic flow diagram of a hydropyrolysis process for producing liquid fuels from the co-processing of biomass, according to yet another embodiment of the disclosure.

FIG. 3 depicts a possible process for carrying out the steps of hydropyrolyzing primary feedstock 312 in a first stage or hydropyrolysis reactor 314 using hydrogen-containing stream 316. As shown in FIG. 3, primary feedstock 312 may be fed to hydropyrolysis reactor 314. Primary feedstock 312 may be selected from the group consisting of pyrolysis oil, black liquor, and a slurry. Pyrolysis oil may be generated via catalytic pyrolysis (in the absence of a high-pressure hydrogen atmosphere). Pyrolysis oil may increase the yield of aromatics and naphthenes in the combined total hydrocarbon product. Black liquor, which is generated by the Kraft papermaking process, consists of an aqueous solution of lignin and hemicelluloses, as well as a wide variety of other contaminants and inorganic compounds. It has been found that black liquor, when converted via an integrated hydropyrolysis and hydroconversion process, increases the proportional yield of gasoline-range hydrocarbons and the aromatics and naphthenics content of the various cuts of the total hydrocarbon product. As previously noted, aromatics content is an important parameter of any hydrocarbon fuel. In gasoline, aromatics content may have a significant effect on octane number, and in diesel, kerosene, and jet fractions aromatics content has an important effect on cloud point and viscosity. While aromatics content, and the content of related molecules, should be kept within certain ranges, and below certain maximum values, in order to meet fuel specifications, it has now been found that co-processing of a liquid feedstock such as pyrolysis oil, with another liquid feedstock, such organic liquid 352 (e.g., vegetable oil), may allow for adjusting of properties of the total hydrocarbon product, and optimizing the product by adjusting the proportions of the different liquid feedstocks that are converted. While an integrated hydropyrolysis and hydroconversion process may be capable of converting a solid feedstock, it is also possible to operate the process in such a manner that only one or more liquid feedstocks are converted. The properties of the liquid hydrocarbon product may then be controlled by increasing the proportion of one feedstock versus the other(s) feedstock.

In accordance with the foregoing, the process produces desired fuel product 362. When sole or primary feedstock 312 is pyrolysis oil, then desired fuel product 362 may tend to have a higher proportional yield of aromatics and naphthenes in the total hydrocarbon product than when the sole or primary feedstock is a biomass such as wood. When sole or primary feedstock 312 is black liquor, then desired fuel product 362 may tend to have a higher proportional yield of gasoline-range hydrocarbons and the aromatics and naphthenic content of the various cuts of the total hydrocarbon product than when the sole or primary feedstock is a biomass, such as wood.

In an aspect of the present disclosure, the process comprises adding primary feedstock 312 comprising a hydrophilic or aqueous liquid, e.g., pyrolysis oil, black liquor, and slurries, to the first stage of an integrated hydropyrolysis and hydroconversion process. The process provides a surprising advantage because, conventionally, adding a hydrophilic or aqueous liquid, e.g., pyrolysis oil, black liquor, and slurries to a fixed-bed reactor for hydrotreating is unsuitable due to coking and deposition in the fixed-bed. It has now been discovered that the bubbling fluidized bed 318 of the first stage reactor 314 of an integrated hydropyrolysis and hydroconversion process may accept and suitably treat liquids that are prone to rapid coking under hydroprocessing conditions. While rapid coke formation is often unavoidable, it has been discovered that, due to the nature of the bubbling fluidized bed of the disclosed process, solid coke is reduced or prevented from forming large solid structures. Instead, to the extent coke does form in the first stage reactor 314 of the process, the coke forms on the outer surface of particles of the bed material, is attritted or abraded, and is then removed from the bed via elutriation. The coke is then removed via the char/solids recovery train, e.g., gas-solids separator 332, downstream of the first stage reactor 314. Thus, even aqueous slurries of, for example, high-lipid algae, may be processed directly and continuously in the first stage 314 of the process. The water associated with the slurry evaporates once the slurry enters the bubbling fluidized bed 318, the algal material is heated and devolatilized, and the vapors released during devolatilization are hydrotreated. Any coke or char, formed during devolatilization of the algal material, is then attritted and elutriated.

In an aspect of the present disclosure, it has now been discovered that the bubbling fluidized bed 318 of the first stage 314 of an integrated hydropyrolysis and hydroconversion process provides a unique and surprising advantage with regard to processing of contaminated or low-value feedstock streams (such as black liquor), which may contain catalyst poisons. If the feedstock stream under consideration is a liquid containing catalyst poisons, which rapidly degrade or reduce the activity of catalyst needed to carry out deoxygenation and hydrotreating reactions, then the feedstock stream cannot be processed easily in a fixed-bed reactor. Even in the absence of coking, the bed of such a reactor would require frequent removal and replacement, making steady, stable, continuous operation of the process difficult, if not impossible. Catalyst in the fluidized bed 318 of the first stage 314 of the integrated hydropyrolysis and hydroconversion process is constantly replaced. Specifically, relatively small amounts of fresh catalyst may be added continuously or at intervals through deoxygenating catalyst inlet 322, and spent catalyst may be removed, via attrition and/or elutriation, from the top of the fluidized bed 318. In addition, spent or partially spent deoxygenating catalyst may be continuously or intermittently removed through deoxygenating catalyst drawoff outlet(s) 324. Spent catalyst may be recovered from the process via the same solids recovery train, e.g., gas-solids separator 332, which removes char/coke from the process vapors leaving the first-stage reactor 314. For this reason, the integrated hydropyrolysis and hydroconversion process disclosed herein enables co-processing of a wide range of feedstocks, solid or liquid, which makes it possible to adjust, control, and optimize the properties of the liquid hydrocarbon product stream.

Figure 4:
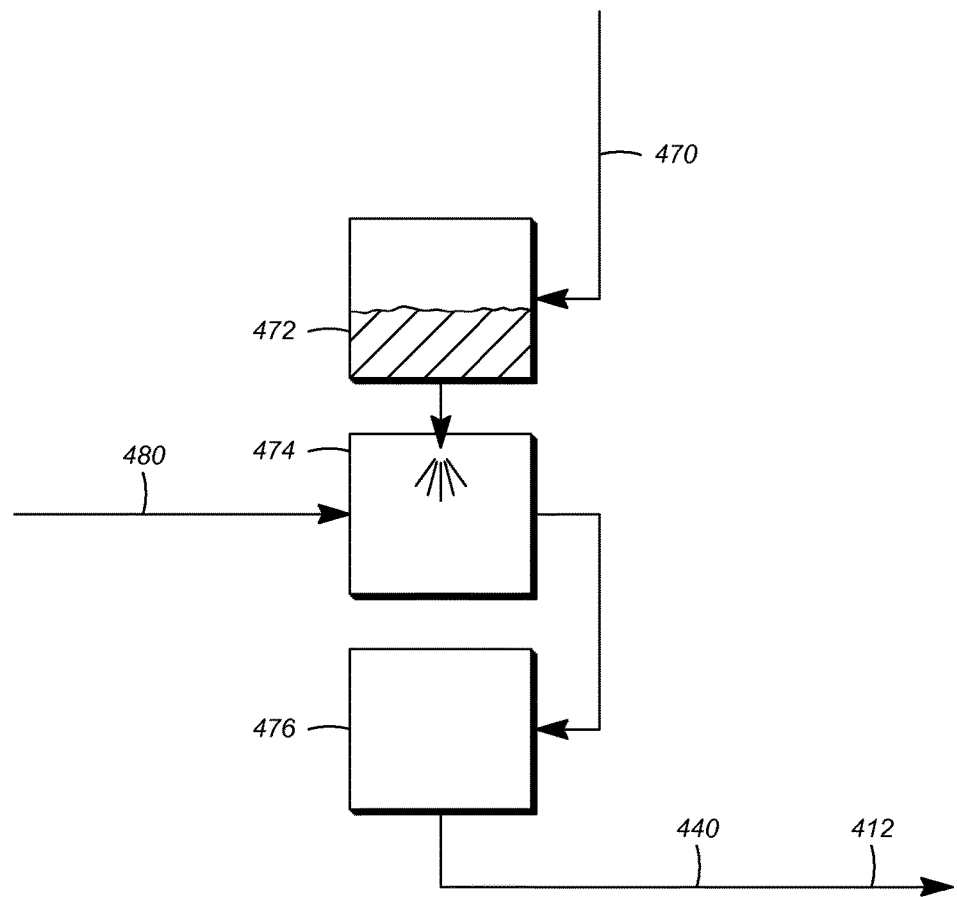
FIG. 4 illustrates a possible method for handling feedstocks for co-processing, in hydropyrolysis processes as described herein.

FIG. 4 depicts a process for carrying out depositing a liquid feedstock 470 onto a solid feedstock 480. Solid feedstock 480 may comprise biomass, e.g., wood chips. As shown in FIG. 4, liquid feedstock 470 may be sprayed or otherwise deposited onto solid feedstock 480 to form feedstock stream 412. In an embodiment, liquid feedstock 470 may be supplied to reservoir 472. Reservoir 472 may supply liquid feedstock 470 to sprayer 474. Sprayer 474 may be configured to spray liquid feedstock 470 onto solid feedstock 480. After applying liquid feedstock 470 onto solid feedstock 480, the combined feedstock forms feedstock 412. Feedstock 412 may be conveyed from dryer 476 to an inlet of a first stage reactor, according to the embodiments of any of FIGS. 1-3. Thus, liquid feedstock 470 may be conveyed via deposition on solid feedstock 480 to inlet 440 and then treated in a first stage reactor 114, 214, 314 (shown in FIGS. 1, 2, and 3, respectively) of an integrated hydropyrolysis and hydroconversion process. Liquid feedstock 470 may be selected from the group consisting of pyrolysis oil, black liquor, and aqueous slurry. The aqueous slurry may comprise algae. Black liquor and aqueous slurry contain a high level of water. The water may then be driven off, e.g., dried, in drier 476, leaving the most valuable fractions of liquid feedstock 470 as a solid or semi-solid deposit on and within the solid feedstock 480. These valuable fractions may then be conveyed into the first stage reactor 114, 214, 314. In addition, any coke generated during devolatilization of the feedstock may tend to be incorporated into the structure of the solid char of the wood chips, and catalyst poisons or corrosive species (such as chlorine) may also be effectively bound to that char. When the char is elutriated from the bed, and recovered from the process, the coke, catalyst poisons, and corrosive species may also tend to be removed.

In an aspect of the present disclosure, liquid feedstock 470 may comprise a hydrophobic feedstock, or more generally comprise any of the co-feeds described herein. As described above, liquid feedstock 470 may alternatively comprise a product recovered from the hydropyrolysis process, such as a hydropyrolysis bio-oil that is condensed from the hydropyrolysis reactor vapor or otherwise a heavy boiling range fraction, having an initial boiling point of greater than about 400° C. (752° F.) and recovered by fractionation of the substantially fully deoxygenated hydrocarbon liquid. In exemplary embodiments, liquid feedstock 470 may be selected from the group consisting of fats, oils and greases, including but not limited to vegetable oil. The hydrophobic feedstock may be co-processed with a solid feedstock, including but not limited to wood chips in the first-stage reactor 114, 214, 314 of an integrated hydropyrolysis and hydroconversion process. Hydrophobic feedstocks, such as vegetable oils, cannot be significantly improved via drying. Thus, dryer 476 may not be needed when liquid feedstock 470 comprises hydrophobic feedstock(s). In this case, it is still possible to co-process liquid feedstock 470 with the solid feedstock 480, without significantly modifying the first-stage reactor (114, 214, 314), the second-stage reactor (150, 250, 350) or any other part of the process equipment. It has now been discovered that lignocellulosic feedstocks may adsorb large quantities of these liquids (i.e. fats, vegetable oils, etc.). It has been found that wood chips (e.g., sawdust), if sufficiently dry, may adsorb enough hydrophobic liquid to produce a combined feedstock that is over 50% by mass liquid. Surprisingly, the mechanical properties of the resulting combination (sawdust plus oil) are still quite similar to those of the dry wood chips. No modifications to the solids-handling equipment need be made in order to introduce the treated feedstock 412 into the first-stage reactor (114, 214, 314) and the liquid feedstock 470 then participates in the process as it would if it were injected directly into the first-stage reactor (114, 214, 314).

Figure 5:
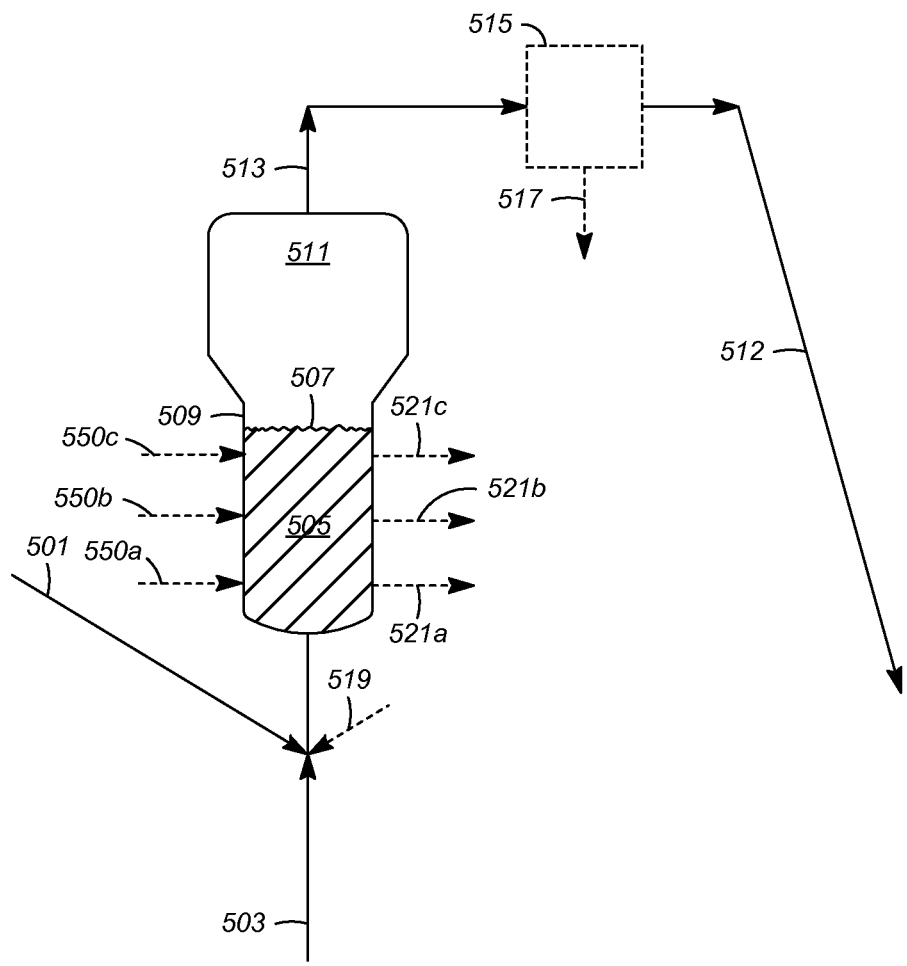
FIG. 5 depicts a representative pre-reactor, for pretreating a biomass-containing feedstock or a co-feed, as described herein, or both.

FIG. 5 depicts one possible process for carrying out the pretreatment of a biomass-containing feedstock and a co-feed (e.g., an aliphatic hydrocarbon precursor or aromatic hydrocarbon precursor as described herein), followed by hydropyrolysis of a pre-reactor vapor stream that is generated from the pretreatment. Particularly problematic liquid feedstocks, such as black liquor, may be devolatilized in a pre-reactor 509 upstream of first-stage reactor (114, 214, 314) of an integrated hydropyrolysis and hydroconversion process. Pre-reactor 509 may comprise a fluidized bed 505 of some solid material, a mechanically-agitated bed, a heated, pressurized ball mill, etc. The function of the pre-reactor 509 may be to convert the feedstock, entering pre-reactor 509 through feedstock inlet 501, into a stream of process vapor, which may then be further processed in the first-stage reactor (114, 214, 314). Solid feedstocks, such as wood chips or materials derived from municipal solid waste, may also be co-processed along with liquid feedstocks in pre-reactor 509. The properties of any solid bed material in the pre-reactor may also trap catalyst poisons and corrosive species, significantly improving the properties and characteristics of the stream of process vapor entering the first stage reactor. In an aspect, the feedstock in feedstock inlet 501 may comprise a liquid feedstock selected from the group consisting of an animal fat or a plant oil that includes triglycerides and/or free fatty acids (e.g., brown grease, vegetable oils, and tall oils), pyrolysis oil, black liquor, and aqueous slurry, and combinations thereof. In an aspect, the feedstock may further comprise a solid, biomass-containing feedstock.

According to this particular embodiment, liquid feedstock (e.g., an aliphatic hydrocarbon precursor or aromatic hydrocarbon precursor) and solid biomass-containing feedstock may be introduced to a lower section (e.g., the bottom) of pre-reactor 509 through feedstock inlet 501 after being combined with a pre-reactor gas, introduced to pre-reactor 509 through pre-reactor gas inlet 503. The feedstock and the pre-reactor gas may be introduced to pre-reactor 509 at the same or different locations, for example within particle bed 505. Both the feedstock and the pre-reactor gas may, independently, also be introduced at multiple locations, for example through inlets 550a, 550b, and 550c. For example, the pre-reactor gas may be introduced at multiple axial heights, corresponding to the heights of inlets 550a, 550b, and 550c, of pre-reactor 509 (corresponding to those within and/or outside of, particle bed 505) for the purpose of controlling temperature and/or localized gas velocities, or otherwise improving the uniformity of consumption of reactant gases (e.g., hydrogen).

Pre-reactor gas may comprise hydrogen, or an inert gas, such as carbon dioxide, and have a sufficient superficial velocity, within pre-reactor 509, for the fluidization of some or all of the solid particles of a particle bed 505 contained in this reactor. Particle bed 505 may include solid particles of biomass-containing feedstock and/or solid particles of an aliphatic hydrocarbon precursor or an aromatic hydrocarbon precursor (if such a co-feed is used in solid form) introduced through feedstock inlet 501, as well as a solid bed material that may be charged to pre-reactor 509 initially and retained in this reactor due to the gas-solid separation occurring at particle bed interface 507, for example if the pre-reactor gas within pre-reactor 509 fluidizes particle bed 505 but has insufficient superficial velocity for the entrainment (elutriation) of the solid bed material. Particle bed interface 507 may therefore represent an upper boundary of an expanded or a quiescent, dense bed phase, or otherwise an upper boundary of a fixed bed. To ensure a complete or substantially complete separation of solid bed material from pre-reactor vapor stream 513 exiting pre-reactor 509, an expanded-diameter gas-solids disengagement zone 511 may be included in an upper section (e.g., freeboard region) of this reactor, above particle bed interface 507. Gas-solids disengagement zone 511 may generally extend to a height above the transport disengagement height (TDH) for particles of solid bed material under the operating conditions employed in pre-reactor 509. Gas-solids disengagement zone 511 may provide a zone of reduced superficial gas velocity, promoting the effective disengagement of relatively small diameter solid particles that would otherwise be elutriated at the higher superficial gas velocity through particle bed 505. Optionally, gas-solid separation may be further improved using mechanical separation devices such as cyclones (not shown) within, or otherwise outside and downstream of, gas-solids disengagement zone 511.

According to one particular embodiment, solids withdrawn from solids drawoff outlets 521a, 521b, and 521c of pre-reactor 509 may include solid bed material having catalytic hydrotreating activity. This activity decreases over time as impurities such as carbon (coke), melted plastic, and other reaction products or feedstock impurities deposit on the solid bed material. Solid bed material that is a hydrotreating catalyst, following removal from solids drawoff outlet(s) 521, may therefore be subjected to a suitable regeneration, by combusting the accumulated coke and other impurities with oxygen to yield a regenerated solid bed material that may be returned to pre-reactor 509 (e.g., through bed material inlet 519). Solids from feedstock may be removed through solids drawoff outlet 521, and these solids may be sent for recovery/reclamation of non-biological materials (e.g., plastics).

According to the embodiment of FIG. 5, pre-reactor vapor stream 513 is fed to optional pre-reactor gas-solids separator 515, for the removal of entrained solids such as char and/or fine particles of solid bed material. Entrained solids may be removed using mechanical devices including filters, external cyclones, electrostatic separators, liquid contactors (e.g., bubblers), etc. If pre-reactor gas-solids separator 515 is used, a purified pre-reactor vapor stream 512 is obtained, having a reduced content of solids relative to pre-reactor vapor stream 513. Depending on the particular method for separating the solids, a solids-enriched stream 517 may also be obtained, having an increased content of solids relative to pre-reactor vapor stream 513. For example, external cyclones, electrostatic separators, and other mechanical devices may provide a continuous solids-enriched stream 517 of relatively concentrated solid particles. In general, the solid particles in solids-enriched stream 517 may have a higher average particle size and/or higher average particle weight, compared to any solid particles remaining in purified pre-reactor vapor stream 512. If gas-solids separator 515 is used, a portion of pre-reactor vapor stream 513, namely purified pre-reactor vapor stream 512 may be introduced via inlet 540 to a hydropyrolysis reactor (114, 214, 314), and solids-enriched stream 517 may be removed from the hydropyrolysis process. If a gas-solids separator is not used, then the entire pre-reactor vapor stream 513, including solids entrained from pre-reactor 509, may be introduced to a hydropyrolysis reactor (114, 214, 314).

In addition to all or a portion of pre-reactor vapor stream 513, a hydrogen-containing stream (116, 216, 316) may also be introduced to the hydropyrolysis reactor (114, 214, 314) and, if used (for example, according to the particular embodiment depicted in FIG. 1, FIG. 2, or FIG. 3).

According to the embodiments of FIG. 1, FIG. 2, or FIG. 3, a hydroconversion product stream 154, 254, 354 (e.g., the effluent or output from a hydroconversion reactor), containing a gaseous mixture including hydrogen and other non-condensable gases (e.g., CO, $CO_2$, and/or $CH_4$) may be cooled using hydroconversion zone outlet heat exchanger 156, 256, 356, which may utilize an external heat exchange medium (e.g., cooling water), an exchange medium internal to the integrated process (e.g., a feed stream), or a combination thereof. Cooling of hydroconversion product stream 154, 254, 354 (e.g., the output from a single hydroconversion reactor, or otherwise two or more of such reactors, as described above) allows for phase separation of the components of this stream in separator 158, 258, 358. Separator 158, 258, 358 may comprise one or more stages of phase separation, which may be achieved, for example, using one or more flash separators operating in series, or otherwise using a packed column, and optionally a stripping medium (e.g., a flowing stripping gas), to achieve multiple theoretical equilibrium liquid-vapor separation stages. Due to the significant differences in relative volatility between components of the gaseous mixture and components of the substantially fully deoxygenated hydrocarbon liquid, separation using a single flash separator or two flash separators may be sufficient.

From separator 158, 258, 358, substantially fully deoxygenated hydrocarbon liquid 162, 262, 362 is recovered as a condensed fraction or liquid phase, and gaseous mixture 144, 244, 344 is removed as a non-condensed fraction or vapor phase. At least a portion of separated gaseous mixture 144, 244, 344 is introduced to steam reformer 160, 260, 360, which provides a net production of hydrogen that may be recycled via compressor 126, 226, 326, to satisfy some or all of the hydrogen requirements of the integrated process. Steam reformer 160, 260, 360 also generates a net amount of $CO_2$. The output from steam reformer 160, 260, 360, or a portion thereof, may be enriched in hydrogen (e.g., by selective removal of $CO_2$ and/or other gases) using additional separation equipment (not shown), for example a membrane separation unit or a pressure swing adsorption (PSA) unit, to provide a high purity hydrogen-containing gas stream for recycle to the hydropyrolysis reactor 114, 214, 314. In addition, substantially fully deoxygenated hydrocarbon liquid 162, 262, 362 may be fractionated, as described above, using further separation equipment (not shown), for example a distillation column or series of distillation columns, to obtain substantially fully deoxygenated higher value liquid products such as gasoline boiling-range and/or diesel fuel boiling-range hydrocarbon fractions.

Overall, aspects of the disclosure are associated with hydropyrolysis processes in which the use of co-feed may beneficially enhance an operating condition or a product property, often in combination with further advantages and beneficial results as described herein, including improved flexibility to meet a variety of process and end product objectives. Those having skill in the art, with the knowledge gained from the present disclosure, will recognize that various changes can be made in these methods, without departing from the scope of the present disclosure. Mechanisms used to explain theoretical or observed phenomena or results, shall be interpreted as illustrative only and not limiting in any way the scope of the appended claims. Although in the foregoing specification this disclosure has been described in relation to certain preferred embodiments thereof, and details have been set forth for purpose of illustration, it will be apparent to those skilled in the art that the disclosure is susceptible to additional embodiments and that certain of the details described herein can be varied considerably without departing from the basic principles of the disclosure. It should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only, and not limiting of the disclosure as set forth in the appended claims.

We claim:

1. A process for producing liquid products comprising:
   a) hydropyrolyzing a biomass-containing feedstock, and a separate co-feed different from the biomass-containing feedstock, in a hydropyrolysis reactor vessel comprising a deoxygenating catalyst and operating at a hydrogen partial pressure from about 7 barg (102 psig) to about 55 barg (798 psig) to produce a hydropyrolysis reactor output comprising at least one non-condensable gas, a partially deoxygenated hydropyrolysis product and char;
   b) removing substantially all char particles from the hydropyrolysis reactor output to provide a purified hydropyrolysis reactor vapor stream having reduced char content;
   c) hydroconverting at least a portion of the purified hydropyrolysis reactor vapor stream in a hydroconversion reactor vessel comprising a hydroconversion catalyst to produce a hydroconversion reactor output; and
   d) recovering a substantially fully deoxygenated hydrocarbon liquid and a gaseous mixture from the hydroconversion reactor output;
   wherein the separate co-feed comprises an oxygenated plastic; and
   wherein oxygen present in the oxygenated plastic is at least partly removed in the hydropyrolysis reactor vessel and a structure of the oxygenated plastic, following oxygen removal, is used to generate aliphatic hydrocarbons or aromatic hydrocarbons in the substantially fully deoxygenated hydrocarbon liquid,
      wherein the oxygenated plastic comprises poly(methyl methacrylate) or polyamide, and a feed rate of the oxygenated plastic is adjusted in response to a measured or desired change in a yield or cetane number of a diesel boiling range fraction of the substantially fully deoxygenated hydrocarbon liquid, or
      wherein the oxygenated plastic comprises polycarbonate or polyethylene terephthalate, and a feed rate of the oxygenated plastic is adjusted in response to a measured or desired change in a yield or octane number of a gasoline boiling range fraction of the substantially fully deoxygenated hydrocarbon liquid.

2. The process claim 1, wherein the hydropyrolysis reactor vessel is a fluidized bed reactor and the hydroconversion reactor vessel is a fixed bed reactor.

3. The process of claim 1, wherein a poison of the hydroconversion catalyst is removed in the char particles prior to hydroconverting step (c).

4. The process of claim 1, wherein the hydrogen partial pressure is from about 13.8 barg (200 psig) to about 34.5 barg (500 psig).

5. The process of claim 1, wherein the deoxygenating catalyst comprises at least one Group VIII metal and at least one Group VI metal on a support comprising a refractory inorganic oxide.

6. The process of claim 1, wherein the oxygenated plastic is present in municipal solid waste (MSW).

7. The process of claim 1, wherein the biomass-containing feedstock comprises wood.

8. The process of claim 1, further comprising removing spent deoxygenating catalyst from a fluidized bed in the hydropyrolysis reactor vessel and replacing the spent deoxygenating catalyst with fresh deoxygenating catalyst.

9. The process of claim 1, further comprising steam reforming at least a portion of the gaseous mixture, producing reformed hydrogen.

10. The process of claim 9, further comprising recycling at least a portion of the reformed hydrogen to the hydropyrolysis reactor vessel.

11. The process of claim 1, wherein steps a) and c) are operated at conditions under which at least about 20% of oxygen in the feedstock is converted to CO and $CO_2$, following the hydropyrolyzing and hydroconverting steps.

12. The process of claim 1, wherein the hydropyrolyzing step is exothermic.

13. The process of claim 1, wherein the hydroconverting step is exothermic.

14. The process of claim 1, wherein the substantially fully deoxygenated hydrocarbon liquid has a total oxygen content of less than about 2% by weight.

15. The process of claim 1, wherein the diesel boiling range fraction of the substantially fully deoxygenated hydrocarbon liquid complies with diesel fuel specifications of a minimum cetane number of 41, a maximum water content of 0.05 wt-%, a maximum sulfur content of 15 ppm, and a maximum cold filter plugging point of 12° C.

16. The process of claim 1, wherein the gasoline boiling range fraction of the substantially fully deoxygenated hydrocarbon liquid complies with gasoline specifications of a minimum motor octane number of 82, a maximum water content of 0.05 wt-%, a maximum sulfur content of 50 ppm, and a maximum benzene content of 3.8 vol-%.

17. The method of claim 1, further comprising condensing an aqueous phase hydroconversion product from the hydroconversion reactor output.

18. The method of claim 1, wherein the diesel boiling range fraction and the gasoline boiling range fraction are obtained from distillation of the substantially fully deoxygenated hydrocarbon liquid.

* * * * *